(12) United States Patent
Pinkerton

(10) Patent No.: US 8,482,087 B2
(45) Date of Patent: Jul. 9, 2013

(54) NANOELECTROMECHANICAL TUNNELING CURRENT SWITCH SYSTEMS

(71) Applicant: Clean Energy Labs, LLC, Austin, TX (US)

(72) Inventor: Joseph F. Pinkerton, Austin, TX (US)

(73) Assignee: Clean Energy Labs, LLC, Austin, TX (US)

( * ) Notice: Subject to any disclaimer, the term of this patent is extended or adjusted under 35 U.S.C. 154(b) by 0 days.

(21) Appl. No.: 13/686,231

(22) Filed: Nov. 27, 2012

(65) Prior Publication Data

US 2013/0081931 A1    Apr. 4, 2013

Related U.S. Application Data

(63) Continuation of application No. 12/571,958, filed on Oct. 1, 2009, now Pat. No. 8,338,728.

(60) Provisional application No. 61/101,909, filed on Oct. 1, 2008, provisional application No. 61/138,837, filed on Dec. 18, 2008.

(51) Int. Cl.
*H01L 29/84* (2006.01)

(52) U.S. Cl.
USPC .......................................................... 257/415

(58) Field of Classification Search
USPC .......................................................... 257/415
See application file for complete search history.

(56) References Cited

U.S. PATENT DOCUMENTS

| | | | |
|---|---|---|---|
| 6,534,839 B1 * | 3/2003 | Frazier et al. | 257/421 |
| 7,279,760 B2 * | 10/2007 | Viefers et al. | 257/415 |
| 7,612,424 B1 * | 11/2009 | Espinosa et al. | 257/415 |
| 7,932,511 B2 * | 4/2011 | Duan et al. | 257/9 |
| 8,338,728 B2 * | 12/2012 | Pinkerton | 200/181 |
| 2002/0153583 A1 * | 10/2002 | Frazier et al. | 257/448 |
| 2004/0238907 A1 * | 12/2004 | Pinkerton et al. | 257/419 |

\* cited by examiner

*Primary Examiner* — R S Luebke
*Assistant Examiner* — Lheiren Mae Caroc
(74) *Attorney, Agent, or Firm* — Greenberg Traurig, LLP

(57) ABSTRACT

A nanoelectromechanical tunneling current switch includes a cantilevered nanofilament including a secured end and an unsecured end and a conductor with a surface substantially perpendicular to a longitudinal axis of the nanofilament when the nanofilament is undeflected. The nanofilament is positioned with respect to the conductor to define a gap between the unsecured end of the nanofilament and the surface of the conductor substantially perpendicular to the longitudinal axis of the nanofilament. The nanofilament and the conductor are electrically connected by a circuit, and a tunneling current is configured to flow from the nanofilament to the surface of the conductor substantially perpendicular to the longitudinal axis of the nanofilament. In other embodiments of the nanoelectromechanical tunneling current switch, an electrically conductive membrane can be utilized in place of, or in addition to, the cantilevered nanofilament.

15 Claims, 37 Drawing Sheets

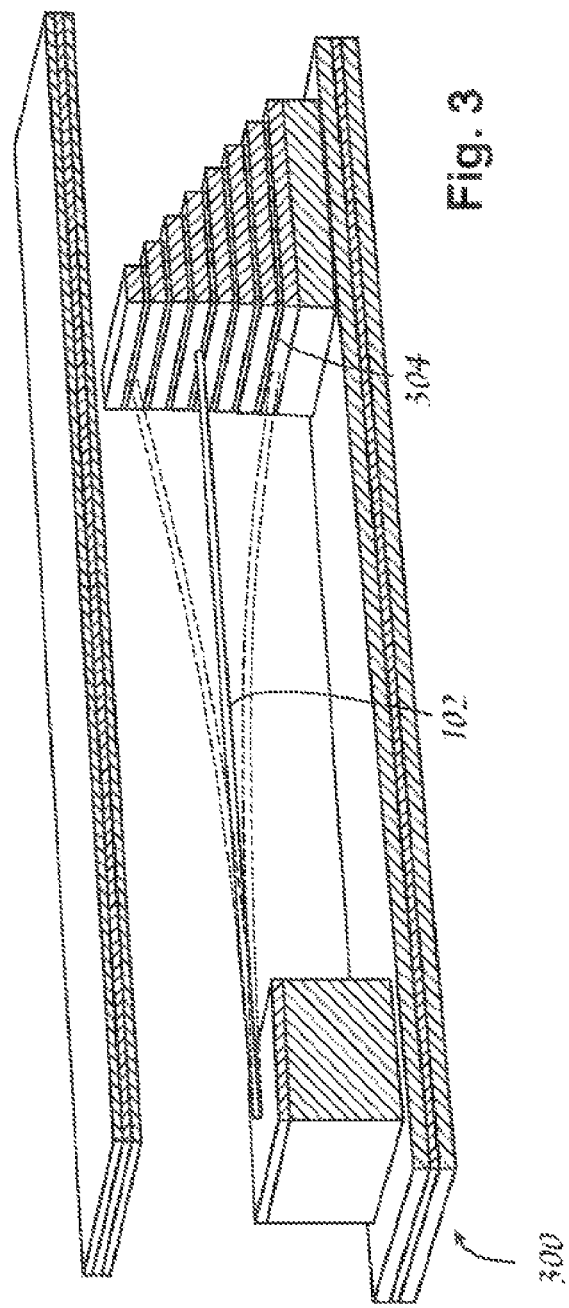

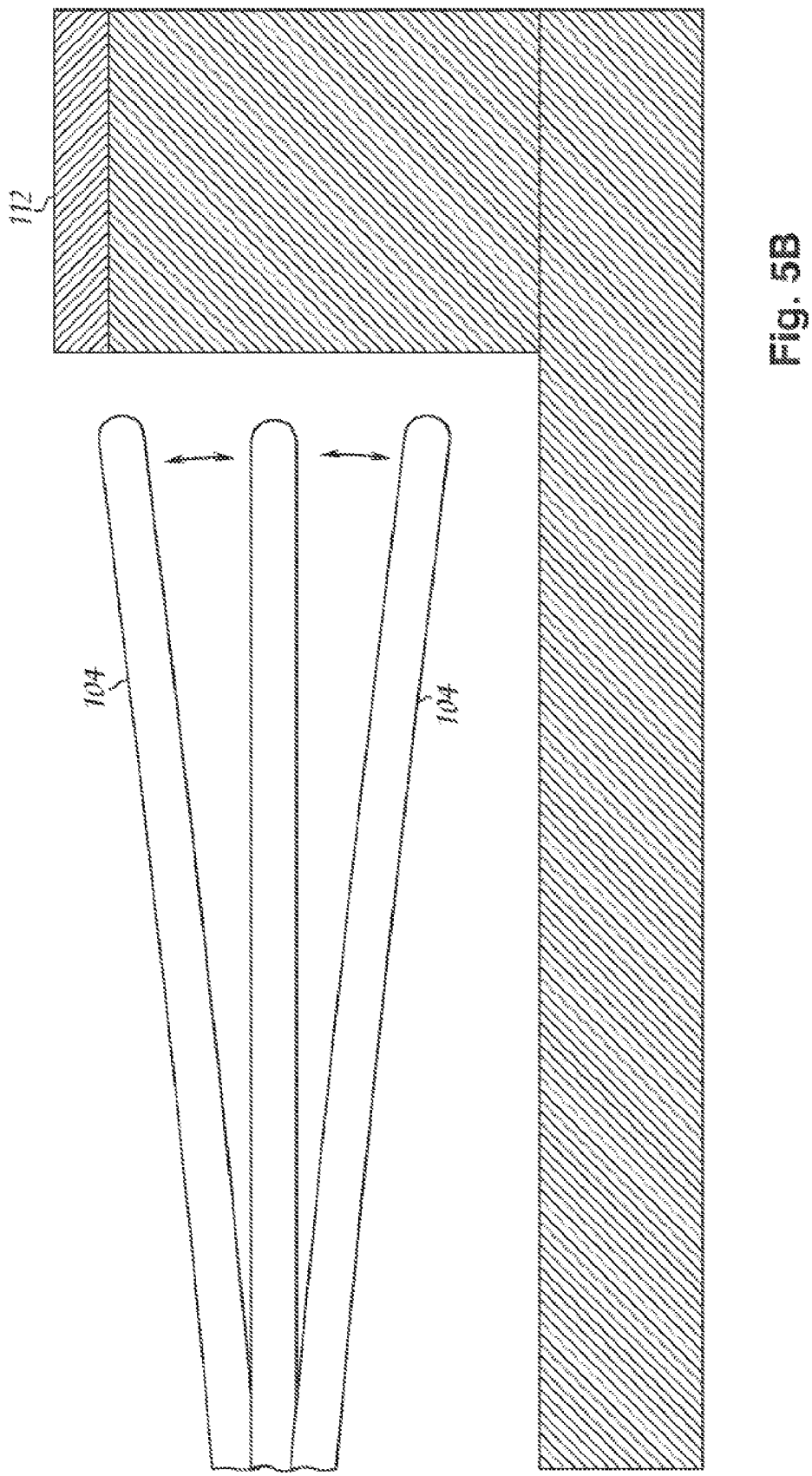

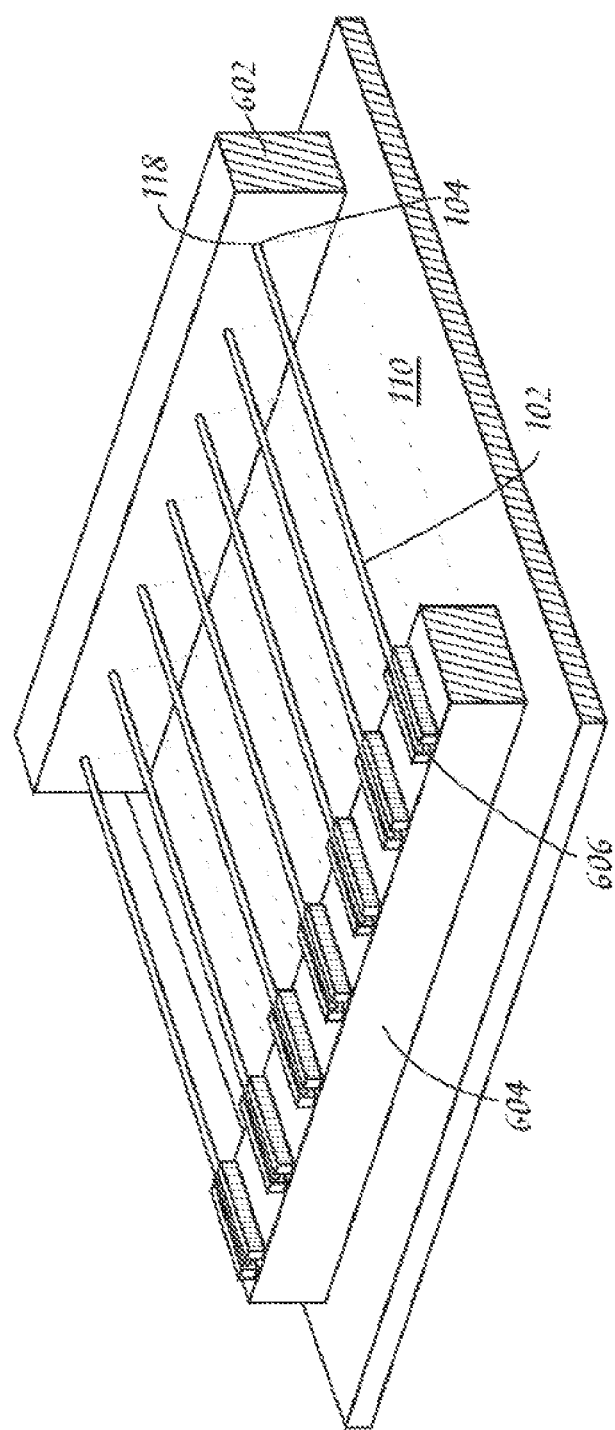

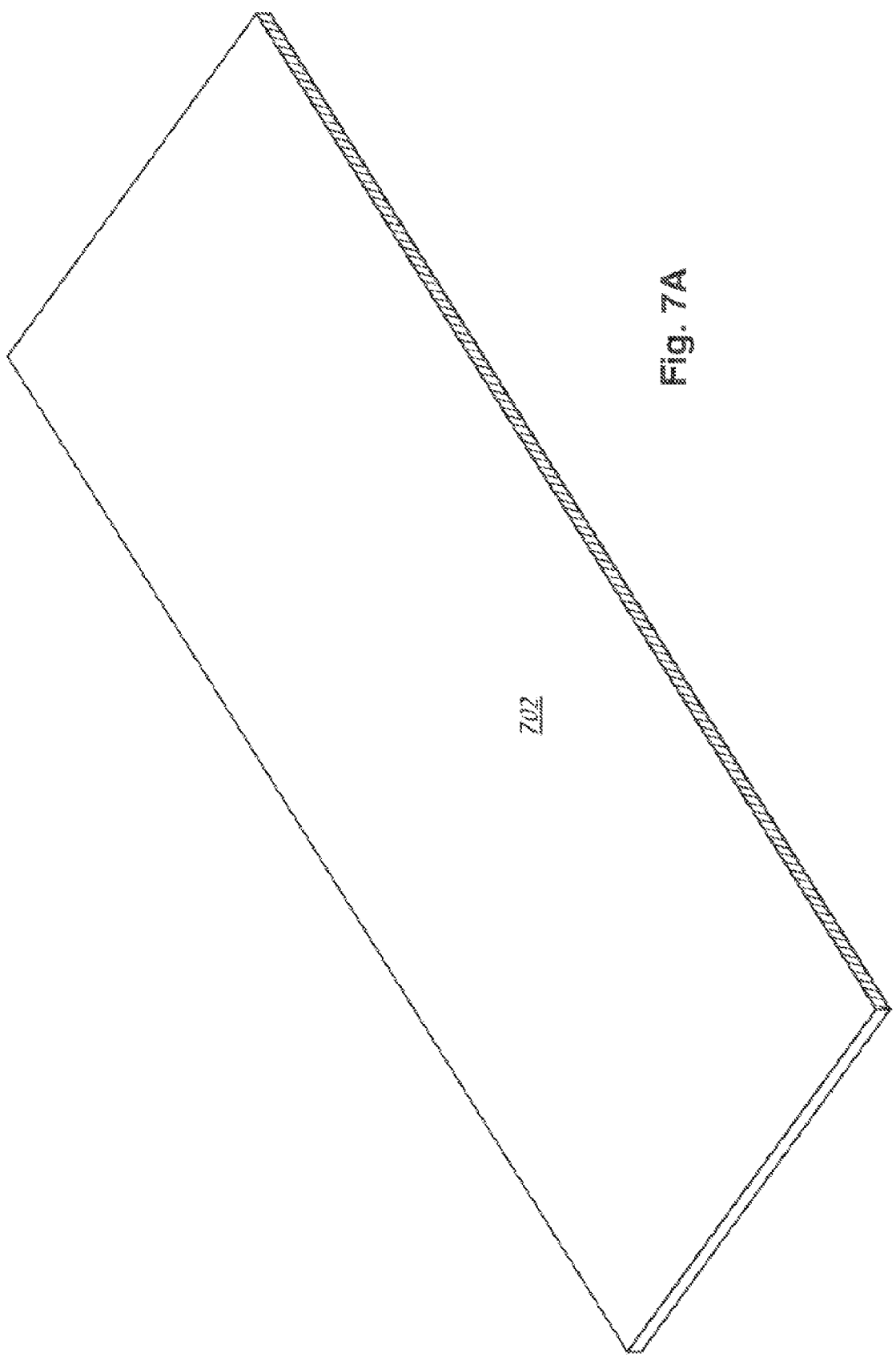

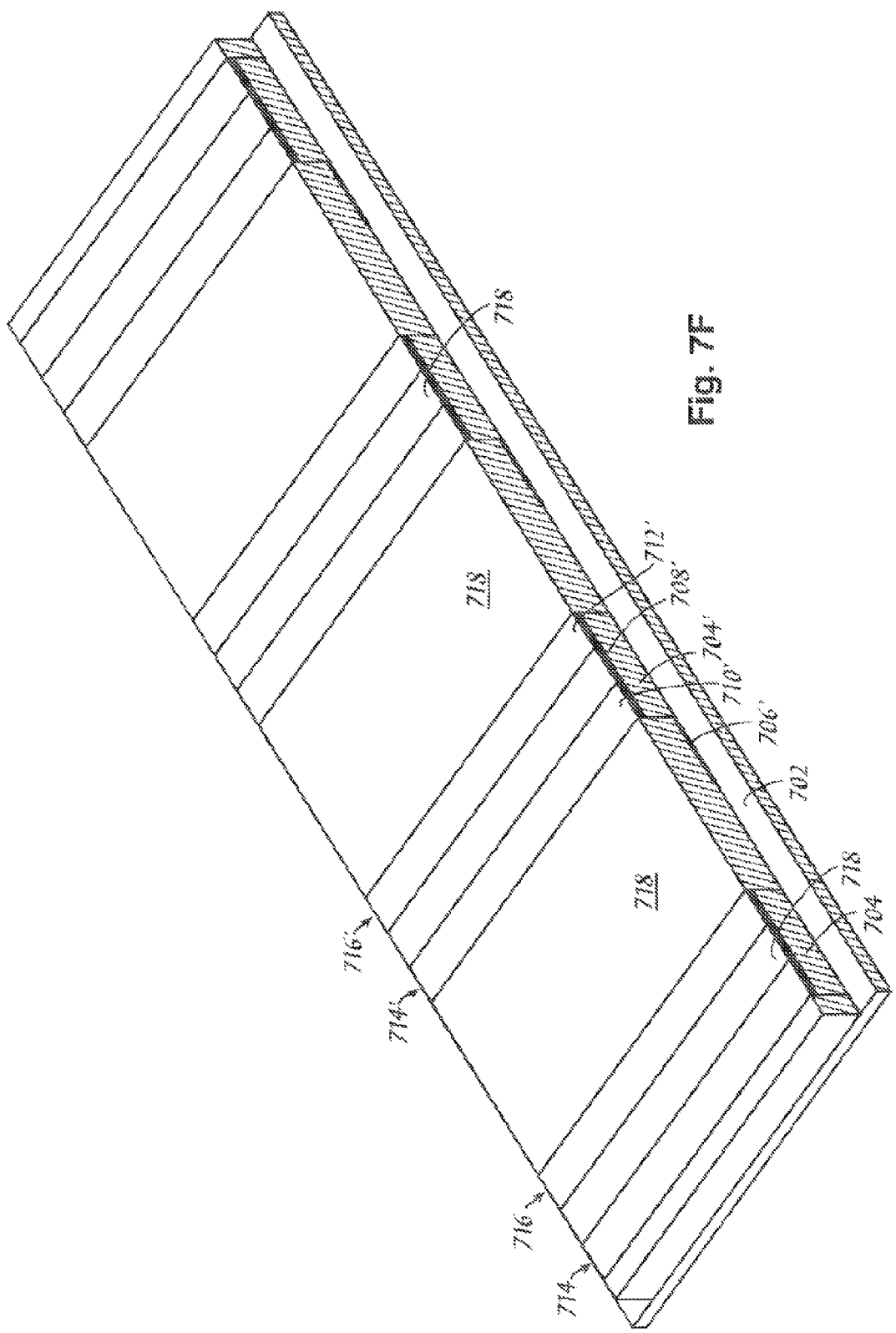

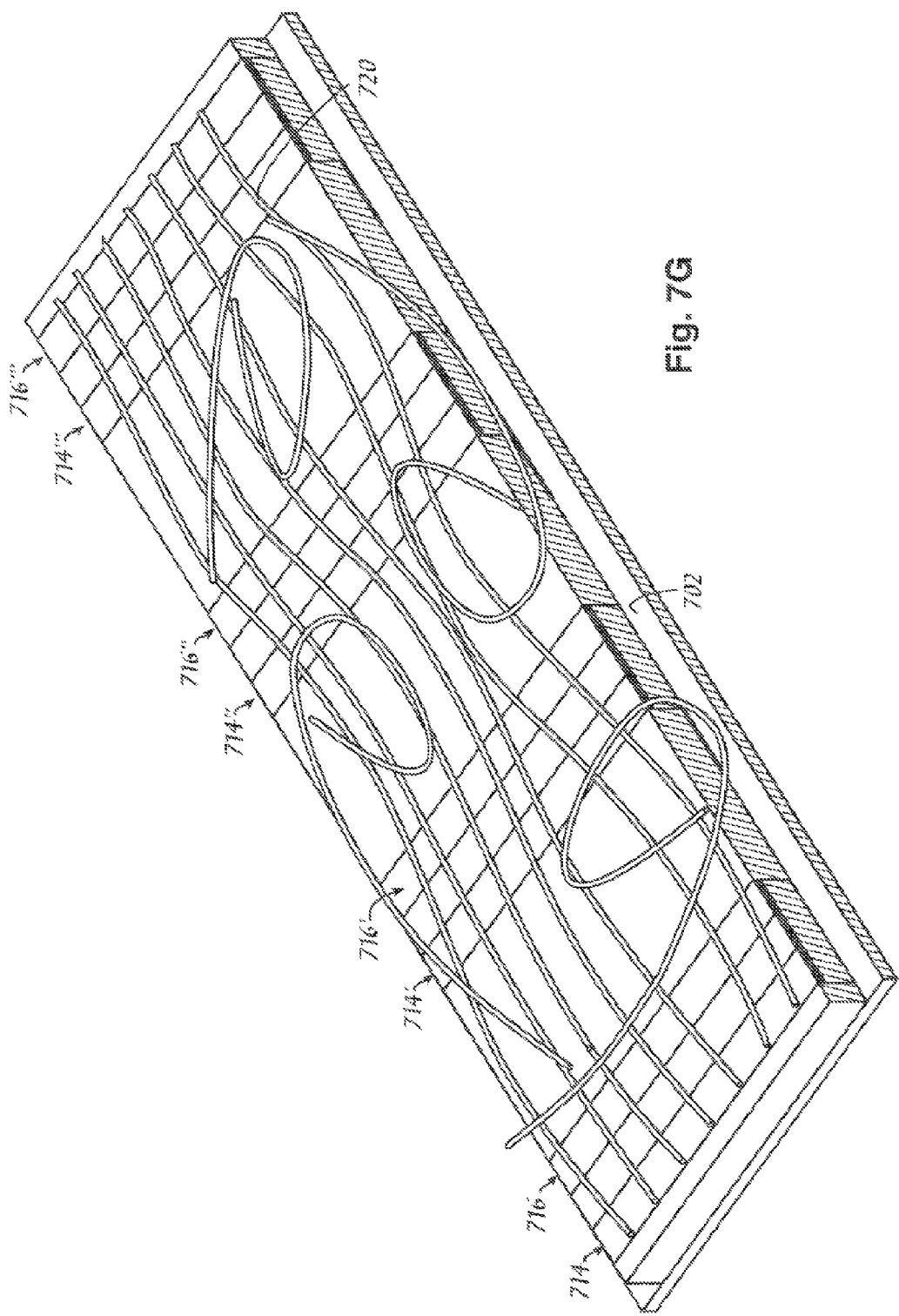

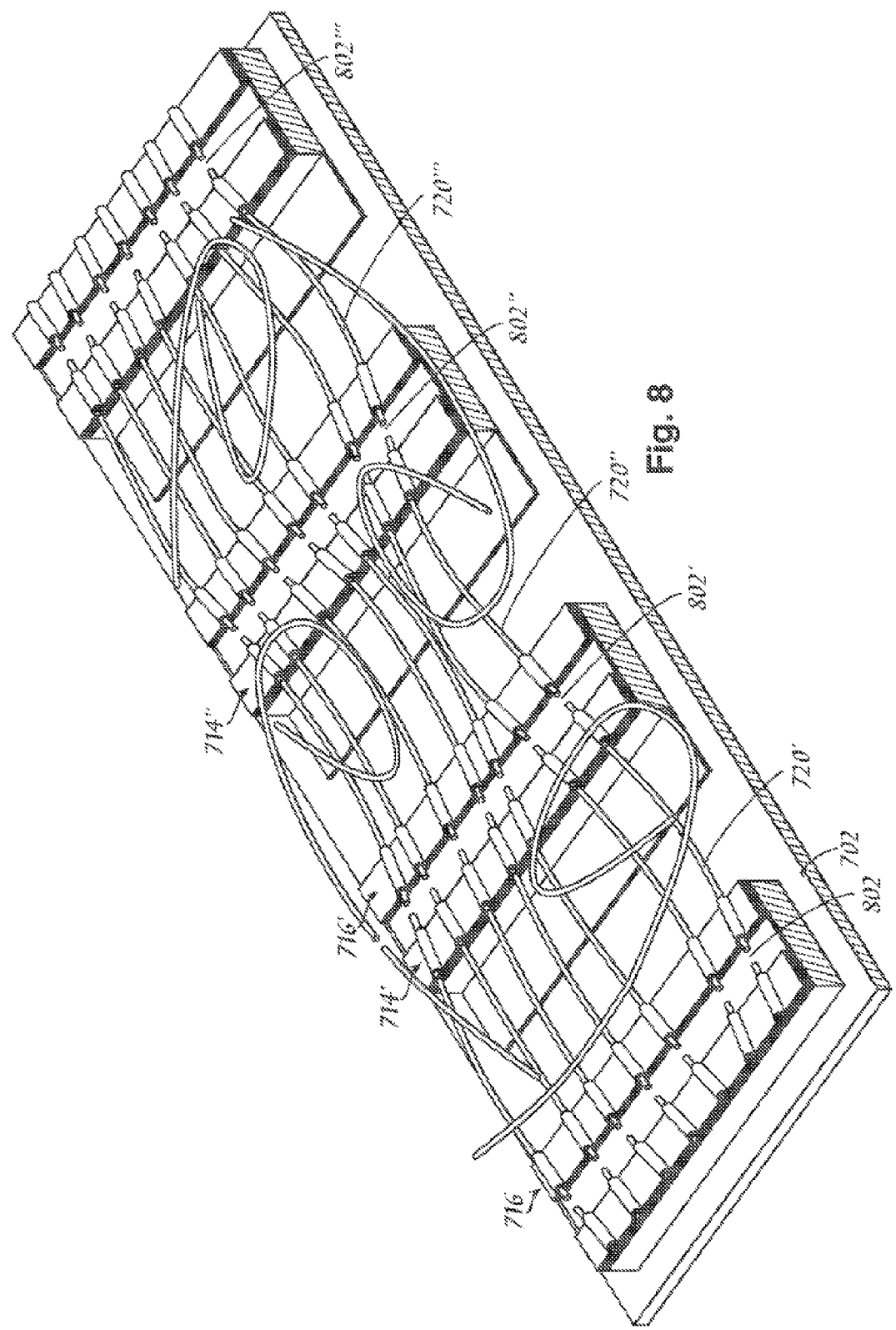

NANOELECTROMECHANICAL TUNNELING CURRENT SWITCH SYSTEMS

CROSS-REFERENCE TO RELATED PATENT APPLICATIONS

This application claims priority to: provisional U.S. Patent Application Ser. No. 61/101,909, filed on Oct. 1, 2008, entitled "Nanoelectromechanical Tunneling Current Switch Systems," provisional U.S. Patent Application Ser. No. 61/138,837, filed on Dec. 18, 2008, entitled "Fabrication of Nanoelectromechanical Tunneling Current Switch Assemblies," and U.S. patent application Ser. No. 12/571,958, filed Oct. 1, 2009, entitled "Nanoelectromechanical Tunneling Current Switch Systems," which patent applications are each commonly assigned to the Assignee of the present invention and are hereby incorporated herein by reference in their entirety for all purposes.

TECHNICAL FIELD

The present invention relates to nanoelectromechanical (NEM) tunneling current switch systems.

BACKGROUND

Electromechanical assemblies based on suspended nanotubes and other molecular-scale electrically conductive and mechanically flexible wires and their use as motors, generators, pumps, fans, compressors, propulsion systems, transmitters, receivers, heat engines, heat pumps, magnetic field sensors, magnetic field generators, inertial energy storage, and acoustic energy conversion are described in U.S. Pat. No. 7,196,450 to Pinkerton et al. (which patent is incorporated herein by reference).

Thermally driven excitations of multi-wall carbon nanotubes (MWNTs), clamped at one end only, were investigated by Treacy et al. (*Nature* 1996, 381, 678), Electrically driven mechanical vibrations of multiwalled nanotubes was observed by Poncharal et at (*Science,* 1999, 283, 1513). Babic et al. (*Nano Letters* 2003, 3(11), 1577) later described thermally driven mechanical vibrations of suspended doubly clamped single-wall carbon nanotubes (SWNTs) in thermal equilibrium at room temperature, and calculated the Young's modulus of CVD-grown SWNTs from the measured rms vibration amplitude. In U.S. Patent Application Publication No. 2009/0020399, Kim et al provided an electromechanical switch that included an elastic conductive layer (that included at least one layer of graphene) that moved by the application of an electric field.

Microelectromechanical systems (MEMS) and nanoelectromechanical switch systems (NEMSS) that are structured around nanotubes have been developed. Such systems are described, for example, in U.S. Pat. No. 7,148,579 and U.S. Pat. No. 7,256,063 to Pinkerton et al (which patents are hereby incorporated herein by reference). These NEMSS can employed as transistors, amplifiers, variable resistors, adjustable diodes, inverters, memory cells, and energy conversion devices.

In some cases, a carbon nanotube is anchored at one end to an electrical contact. The opposite end of this nanotube is unattached and free to move. By inflicting an electric field on the nanotube when it carries an electric charge, the position and oscillation of the free-moving end of the nanotube can be controlled (e.g., by either repelling or attracting the nanotube). Manipulating the location of the free-moving end of such a nanotube can be utilized to realize many electrical components. For example, a transistor may be realized by configuring the nanotube such that when an appropriate electric field is applied to the nanotube (e.g., a minimum base or gate threshold voltage), the free moving end of the nanotube couples to an electrical contact (e.g., an emitter or drain terminal). Thus, if the anchored end of the nanotube is also coupled to an electrical contact (e.g., collector or source terminal) current may flow through the nanotube when the threshold voltage is met.

Appropriate magnetic fields may also be applied to a partially anchored nanotube. In doing so, the free-moving end of the nanotube may be held in contact, as a result of the magnetic field, with an electrical contact (e.g., emitter or drain contact) when current is flowing through the nanotube. The basic structure of a NEM transistor can also be configured, utilized, or adjusted to provide the functionality of amplifiers, adjustable diodes, inverters, memory cells, and automatic switches.

A nanotube-based NEM transistor of the present invention can have a very low minimum turn-ON voltage. Thus, miniscule voltage signals such as, for example, Johnson noise signals, can be sensed and manipulated. A minimum turn-ON voltage can be selected by adjusting, for example, the charge, length, width, temperature, and elevation of a nanotube.

Nanotube-based NEM transistors can also function as sensors. More particularly, if a strong magnetic field is not applied to a NEM transistor, then the free-moving end of the nanotube will couple to an emitter terminal and a tunneling current will flow at a rate dependent upon the intensity of the electric field created by the base terminal in combination with the charge density of the nanotube. As the intensity or polarity of the electric field created by the base terminal changes, the number of coupling events per unit of time that occur between the nanotube and the emitter contact will change.

SUMMARY OF THE INVENTION

The invention relates to nanoelectromechanical (NEM) tunneling current switch systems.

In general, in one aspect, the invention features a switch that includes a cantilevered nanofilament comprising a secured end and an unsecured end. The switch further includes a conductor with a surface substantially perpendicular to a longitudinal axis of the nanofilament when the nanofilament is undeflected, wherein the nanofilament is positioned with respect to the conductor to define a gap between the unsecured end of the nanofilament and the surface of the conductor substantially perpendicular to the longitudinal axis of the nanofilament. And, the switch further includes a circuit electrically connecting the nanofilament and the conductor, wherein a tunneling current is configured to flow between the nanofilament and the surface of the conductor substantially perpendicular to the longitudinal axis of the nanofilament.

Implementations of the invention can include one or more of the following features: The nanofilament can be a carbon nanotube. The nanofilament can be a nanowire. The conductor can be a conductive trace. The switch can further include one or more additional conductors. The switch can further include a heating element configured to heat the nanofilament. The switch can further include one or more additional nanofilaments to form an array of nanofilaments. The gap can be in a range between about 0.3 nm and about 2 nm. The switch can further include a gate, wherein the gate is operable to create an electric field such that, when the nanofilament is charged, a change in gate voltage will cause a change in the tunneling current.

In general, in another aspect, the invention features a memory element including the switch described above, wherein the nanofilament will tend to center itself near the conductor due to van der Waals forces.

In general, in another aspect, the invention features a memory element including the switch described above, wherein the nanofilament will tend to adhere to a non-conductive sidewall due to van der Waals forces.

In general, in another aspect, the invention features a piezoelectric generator array including the switch described above and having an array of piezoelectric filaments operable to convert heat into a current output.

In general, in another aspect, the invention features forming an electrical circuit between a cantilevered nanofilament including a secured end and an unsecured end and a conductor with a surface substantially perpendicular to a longitudinal axis of the nanofilament when the nanofilament is undeflected. The nanofilament is positioned with respect to the conductor to define a gap between the unsecured end of the nanofilament and the surface of the conductor substantially perpendicular to the longitudinal axis of the nanofilament. A tunneling current is configured to flow between the nanofilament and the surface of the conductor substantially perpendicular to the longitudinal axis of the nanofilament. The method further includes heating the filament.

Implementations of the invention can include one or more of the following feature: the conductor can be a conductive trace.

In general, in another aspect, the invention features a switch including a cantilevered nanofilament having a secured end and an unsecured end, wherein the nanofilament has a thermal amplitude. The switch further includes a conductor with a surface substantially perpendicular to a longitudinal axis of the nanofilament. The nanofilament is positioned with respect to the conductor to define a gap between the unsecured end of the nanofilament and the surface of the conductor substantially perpendicular to the longitudinal axis of the nanofilament. The length of the gap varies in time based at least in part on the thermal amplitude of the nanofilament. And, the switch further includes a circuit electrically connecting the nanofilament and the conductor. The circuit is arranged such that a tunneling current is configured to flow between the nanofilament and the surface of the conductor substantially perpendicular to the longitudinal axis of the nanofilament through the gap, wherein the tunneling current varies in time based at least in part on the thermal amplitude of the nanofilament.

In general, in another aspect, the invention features a switch including a cantilevered nanofilament having a secured end and an unsecured end. The switch further including a conductor with a surface substantially perpendicular to a longitudinal axis of the nanofilament when the nanofilament is undeflected, wherein the nanofilament is positioned with respect to the conductor to define a gap between the unsecured end of the nanofilament and the surface of the conductor substantially perpendicular to the longitudinal axis of the nanofilament. The switch further including a circuit electrically connecting the nanofilament and the conductor, wherein a tunneling current is configured to flow between the nanofilament and the surface of the conductor. And, the switch further including a gate operable to create an electric field such that, when the nanofilament is charged at one polarity (a) a change in gate voltage will cause a change in the tunneling current, such that (b) there can be a non-zero tunneling current even when the gate voltage is zero, and (c) an increase in the gate voltage having an opposite polarity as nanofilament polarity can cause a decrease in the tunneling current.

Implementations of the invention can include one or more of the following feature: when the gate is further operable to create the electric field such, when the nanofilament is charged at one polarity, an increase in the gate charge at an opposite polarity as the nanofilament polarity will cause the tunnel current to turn off completely.

In general, in another aspect, the invention features a method of making a tunneling current switch having cantilevered nanofilaments, the method including selecting a conductive base and a filament base. The method further including placing a film on the conductive base such that when the nanofilaments are secured to the filament base, a defined gap will be formed between the tips of the nanofilaments and the conductive base. The method further including securing the nanofilaments to the filament base. And the method further including removing the film from the conductive base, wherein the defined gap between the tips of the nanofilaments and the conductive base remains.

In general, in another aspect, the invention features a nano-electromechanical switch assembly including an electrically conductive and mechanically continuous membrane supported on at least two sides by the walls of a chamber. The nano-electromechanical switch assembly further including a first electrically conductive member located within the chamber. The nano-electromechanical switch assembly further including a second electrically conductive member located within the chamber. The nano-electromechanical switch assembly further including a first voltage connected to the electrically conductive membrane. And the nano-electromechanical switch assembly further including a second voltage connected to the second electrically conductive member such that the current between the electrically conductive membrane and the first electrically conductive member is operable to be affected by changes in the second voltage.

Implementations of the invention can include one or more of the following features: The nano-electromechanical switch can be a nano-electromechanical tunnel current switch. The chamber can be a sealed chamber. The electrically conductive membrane can be a wall of the sealed chamber. The chamber can be filled with a gas. The chamber can be evacuated. The membrane can include graphene. The current can be a tunneling current. The surface area of the second electrically conductive member that faces the electrically conductive membrane is at least twice as large as the surface area of the first electrically conductive member that faces the electrically conductive membrane. The chamber can be cylindrical. The mechanical stiffness of the electrically conductive membrane can be non-linear when it is within two nanometers of the first electrically conductive member. The surface of the first electrically conductive member can be covered with a coating. The coating can be comprised of graphene. The coating can be comprised of carbon nanotubes.

In general, in another aspect, the invention features a nano-electromechanical switch assembly including an electrically conductive membrane that is a wall of a sealed chamber. The nanoelectromechanical switch assembly further including a first electrically conductive member located within the chamber. The nanoelectromechanical switch assembly further including a second electrically conductive member located within the chamber. The nanoelectromechanical switch assembly further including a first voltage connected to the electrically conductive membrane. And, the nanoelectromechanical switch assembly further including a second voltage connected to the second electrically conductive member such that the current between the electrically conductive membrane and the first electrically conductive member is operable to be affected by changes in the second voltage.

In general, in another aspect, the invention features a nanoelectromechanical switch assembly including a electrically conductive membrane supported on at least two sides by the walls of a chamber. The nanoelectromechanical switch assembly further including a first electrically conductive member located within the chamber. The nanoelectromechanical switch assembly further including a second electrically conductive member located within the chamber. The nanoelectromechanical switch assembly further including a first voltage connected to the electrically conductive membrane. And, the nanoelectromechanical switch assembly further including a second voltage connected to the second electrically conductive member such that the current between the electrically conductive membrane and the first electrically conductive member is operable to be affected by changes in the second voltage, wherein the mechanical stiffness of the electrically conductive membrane is non-linear when it is within two nanometers of the first electrically conductive member.

In general, in another aspect, the invention features a method of fabricating a tunneling current switch, the method including forming a first conductive trace on a substrate. The method further including forming a second conductive trace on a substrate. The method further including forming at least one electrically conductive member across the first and second trace. And the method further including heating the second trace to form a gap between the electrically conductive member and the second trace.

Implementations of the invention can include one or more of the following features: The electrically conductive member can be a nanofilament. The electrically conductive member can be graphene. A voltage can be applied to the electrically conductive member during the step of heating to control the size of the gap. The voltage can be applied to a gate operable to create an electric field that creates a force on the electrically conductive member.

In general, in another aspect, the invention features a nanoelectromechanical tunneling current switch assembly including cantilevered nanofilaments having a secured end and an unsecured end. The nanoelectromechanical tunneling current switch assembly further including a source trace that is angled such that the cantilevered nanofilaments can be different in length from adjacent cantilevered nanofilaments, wherein the nanofilaments can oscillate at their own resonant frequency due to their differences in lengths. And, the nanoelectromechanical tunneling current switch assembly further including a circuit electrically connecting the nanofilament and the source trace, wherein the circuit is operable for using the resonant frequencies of the nanofilaments to individually address the nanofilaments.

Implementations of the invention can include one or more of the following feature: The nanoelectromechanical tunneling current switch assembly can further include gates substantially parallel to the nanofilaments, wherein the gates are operable to create an electric field such that, when the nanofilament is charged, a change in gate voltage will change the state of at least one of the nanofilaments In general, in another aspect, the invention features a method of fabricating an array of nanoelectromechanical tunneling current switches including selecting a substrate. And, the method further including growing straight nanofilaments from catalyst particles on the substrate. The straight nanofilaments are grown in length until the nanofilaments contact a first conductive trace on the substrate. The thickness of the coating on the first conductive trace can be selected based upon a predetermined width of a tunneling gap to be formed between the straight nanofilaments. And, the first conductive trace.

Implementations of the invention can include one or more of the following features: The straight nanofilaments can be carbon nanotubes. The process for growing the straight nanofilaments can include a chemical vapor deposition process. The substrate can include a crystal selected from the group consisting of quartz and sapphire. The method can further include forming a first insulating trace on the first conductive trace and a second insulating trace on the second conductive trace. The method can further include removing the coating to form gaps between the tips of the nanofilaments and the first conductive trace. The substrate can be removed from the array of nanoelectromechanical tunneling current switches.

In general, in another aspect, the invention features a tunneling current switch including an electrically conductive via. The tunneling current switch further including an electrically conductive membrane, wherein the membrane has a middle portion that is operable for flexing toward the via to vary a tunneling current gap. The tunneling current switch further including an electrically conductive gate positioned near the membrane and via. And, the tunneling current switch further including an active feedback loop operatively connected to the gate, wherein the active feedback loop is operable to maintain and control the gap.

Implementations of the invention can include one or more of the following features: The tunneling current switch can further include a closed chamber formed between the membrane and gate. The gas can be present in the chamber. The chamber can be under vacuum. The electrically conductive membrane can include graphene In general, in another aspect, the invention features a nanoelectromechanical tunneling current switch including a source member. And, the nanoelectromechanical tunneling current switch further including a drain member, wherein the majority of the van der Waals forces between the source member and the drain member are passively cancelled with at least one opposing force.

Implementations of the invention can include one or more of the following features: The nanoelectromechanical tunneling current switch can further include a nanofilament operatively connected to the source member, wherein the opposing force is provided by the axial mechanical stiffness of the nanofilament. The nanoelectromechanical tunneling current switch can further include an electrically conductive membrane operatively connected to the source member, wherein the opposing force is provided by the non-linear mechanical stiffness of the electrically conductive membrane. The electrically conductive membrane switch can further include an electrically conductive membrane operatively connected to the source member and a chamber, wherein the opposing force is provided by the combination of the mechanical stiffness of the electrically conductive membrane and gas pressure within the chamber.

In general, in another aspect, the invention features a nanoelectromechanical energy conversion assembly including a piezoelectric flexible membrane supported on at least two sides by a chamber. The nano-electromechanical energy conversion assembly further including a first electrically conductive member located in the chamber. The nano-electromechanical energy conversion assembly further including a second electrically conductive member located in the chamber. And, the nano-electromechanical energy conversion assembly further including a voltage connected to the second electrically conductive member that maintains an average gap between the membrane and the first electrically conductive member.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

DESCRIPTION OF DRAWINGS

FIG. 3 depicts a nanofilament tunnel current switch with multiple conductive traces.

FIGS. 5A-5B depict an array of piezoelectric nanofilaments.

FIGS. 6A-6C depict a method of forming a controllable gap between a nanofilament and a conductor in a nanofilament tunnel current switch.

FIGS. 7A-7H illustrate steps in an embodiment of a method of fabricating a tunneling current switch assembly.

FIG. 8 is a perspective view of an embodiment of a tunneling current switch assembly.

DETAILED DESCRIPTION

Nanofilaments can function as nanomechanical resonators that oscillate at high frequencies with small vibration amplitudes. As used herein, "nanofilament" generally refers to nanoscale wires or tubes, such as SWNTs, zinc oxide nanowires, etc. For example, single-walled carbon nanotubes (SWNTs), with a high Young's modulus and low specific weight, can be incorporated in nanomechanical and nano-electrical mechanical pump assemblies that channel the mechanical vibration modes to provide increased fluid flow in a desired direction. Swept volume and mass flow for these assemblies can be calculated as described below.

In an embodiment of a CNT/NW current tunnel switch, a cantilevered CNT or NW filament has a free tip located near the edge of one or more conductive traces. The traces can be substantially in the same plane as a longitudinal axis of the filament, and a gap is maintained between the filament and the trace(s). Current tunnel switches described herein can be used, for example, as transistors, diodes, sensors, non-volatile memory elements, power switches, and, in some cases, can be used to convert heat into a DC voltage and current.

Figure 1:
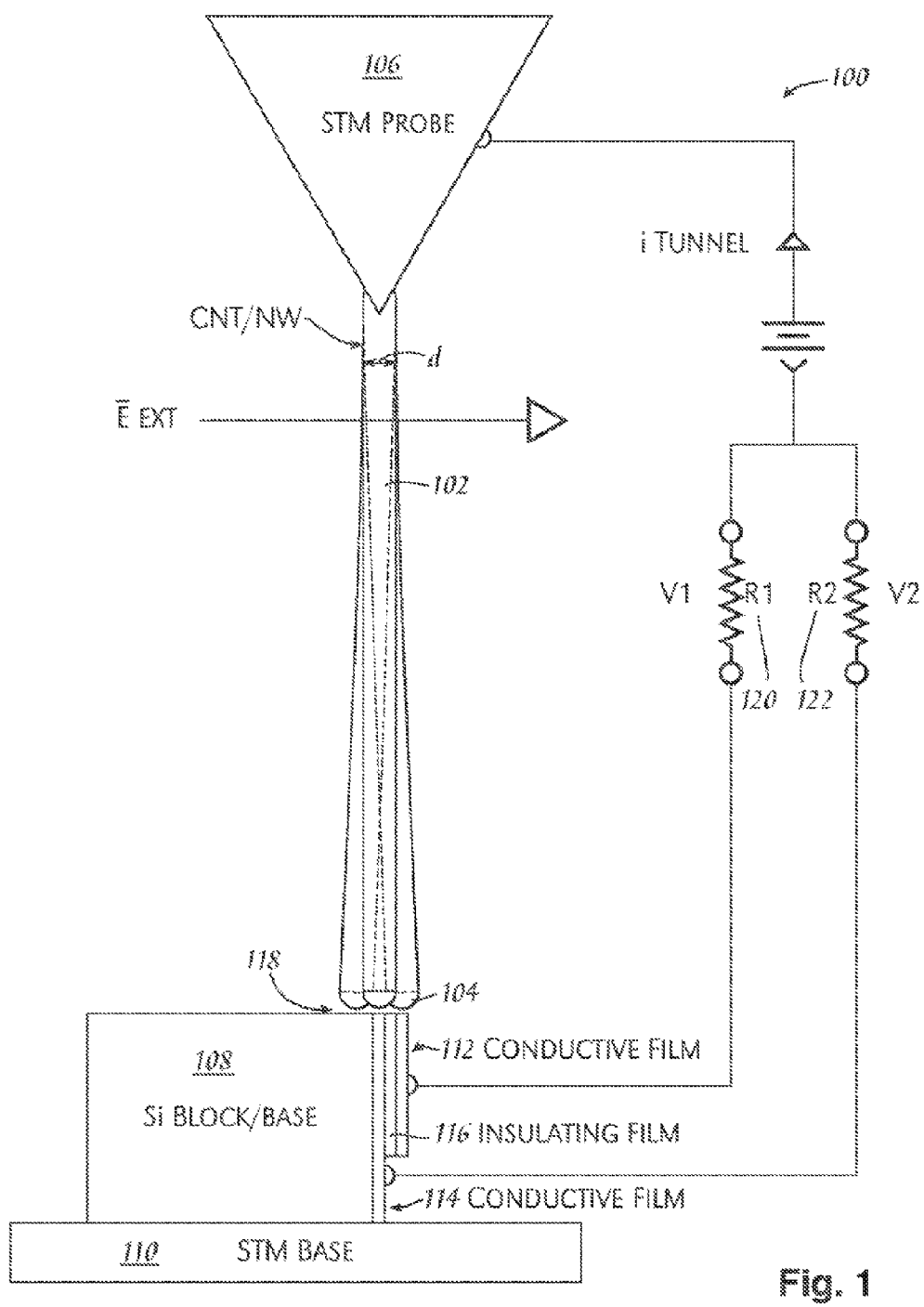
FIG. 1 depicts a schematic diagram of a nanofilament tunnel current switch.

FIG. 1 depicts a CNT/NW current tunnel switch 100. Current tunnel switch 100 includes cantilevered filament 102 with tip 104. Filament 102, with length l and diameter d, is coupled to probe 106, such that tip 104 is proximate base 108 on mount 110. Base 108 includes conductive traces 112 and 114 separated by insulating film 116. Conductive traces 112 and 114 are in substantially the same plane as a longitudinal axis of filament 102 when the filament is undeflected. In some embodiments, the surface of the conductive traces through which the tunneling current enters or exits is substantially perpendicular to the longitudinal axis of the filament when the filament is undeflected. The probe 106 and filament 102 are arranged to form a gap 118 of length x between the tip 104 of the filament and the conductive traces 112 and 114. The gap 118 allows a tunneling current to flow between tip 104 of filament 102 (which acts as a source) and conductive traces 112, 114 (which act as a drain) while inhibiting physical contact between the tip and the conductive traces. Van der Waals (VDW) forces are observable when x is below approximately 5 nm.

A gate can be used to create an electric field which in turn creates a force on the charged filament. The force causes the tip 104 of the filament 102 to move toward or away from the conductive traces 112, 114 (i.e., the drain). The tunneling current may increase or decrease by a factor of about 2 to about 10 if the source-drain gap is changed by as little as about 1/10 nm. Thus, the switch is extremely sensitive to changes in either the gate voltage, the source voltage, or both.

Thermal motion of the tip 104 can be traced by monitoring the relative tunneling currents through resistors 120 and 122. An external electric field (gate field) can be introduced to demonstrate switch operation. Changing the field will change the average current through resistors 120, 122. Even without a gate field but with a voltage applied to filament 102, thermal motion of tip 104 will cause a time varying current through resistors 120 and 122. Rectification will occur if the gate field is left constant and the source voltage alternates in polarity.

Figure 2A:
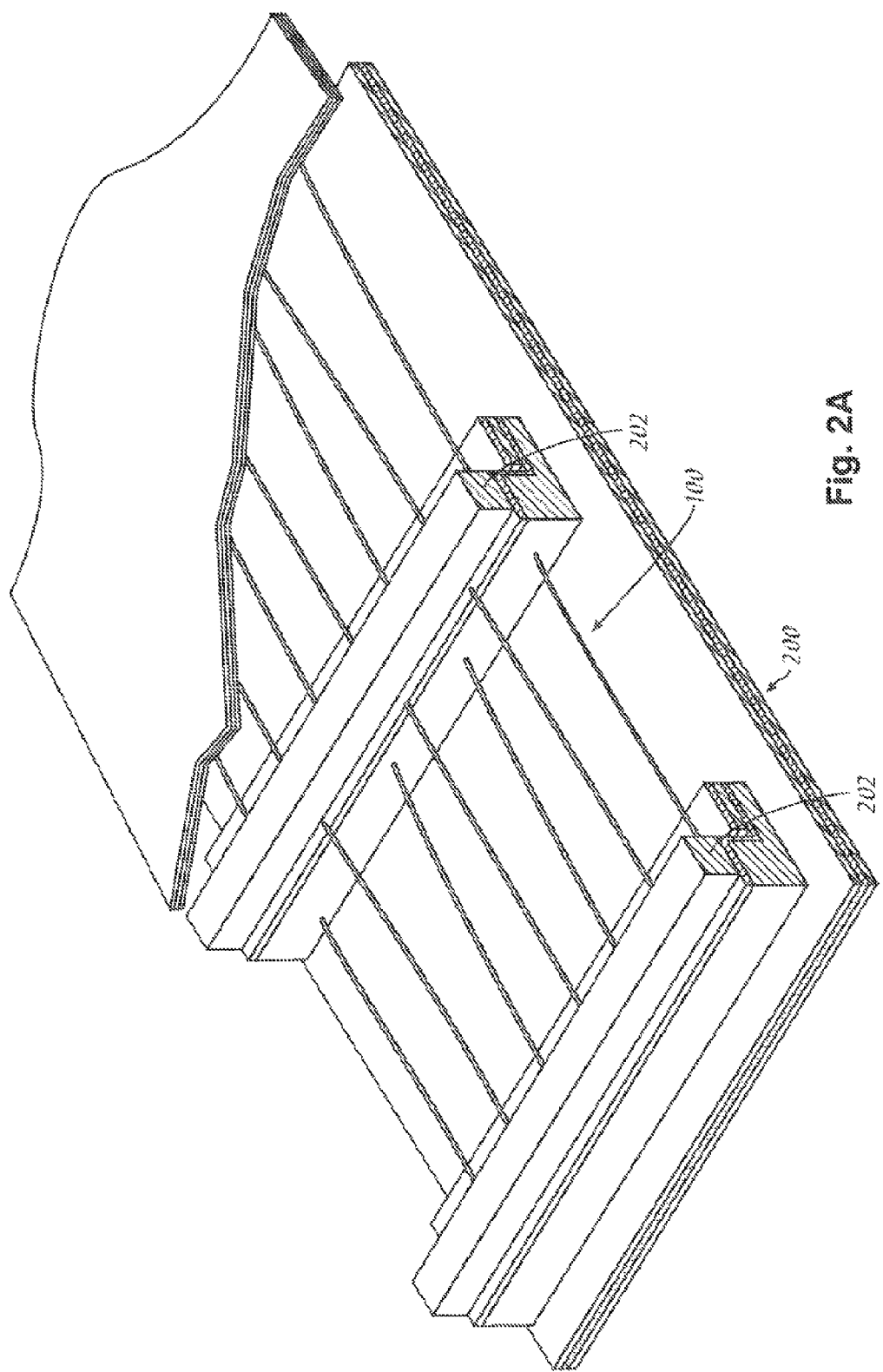
FIGS. 2A-2B depict a nanofilament array tunnel current switch.
Figure 2B:
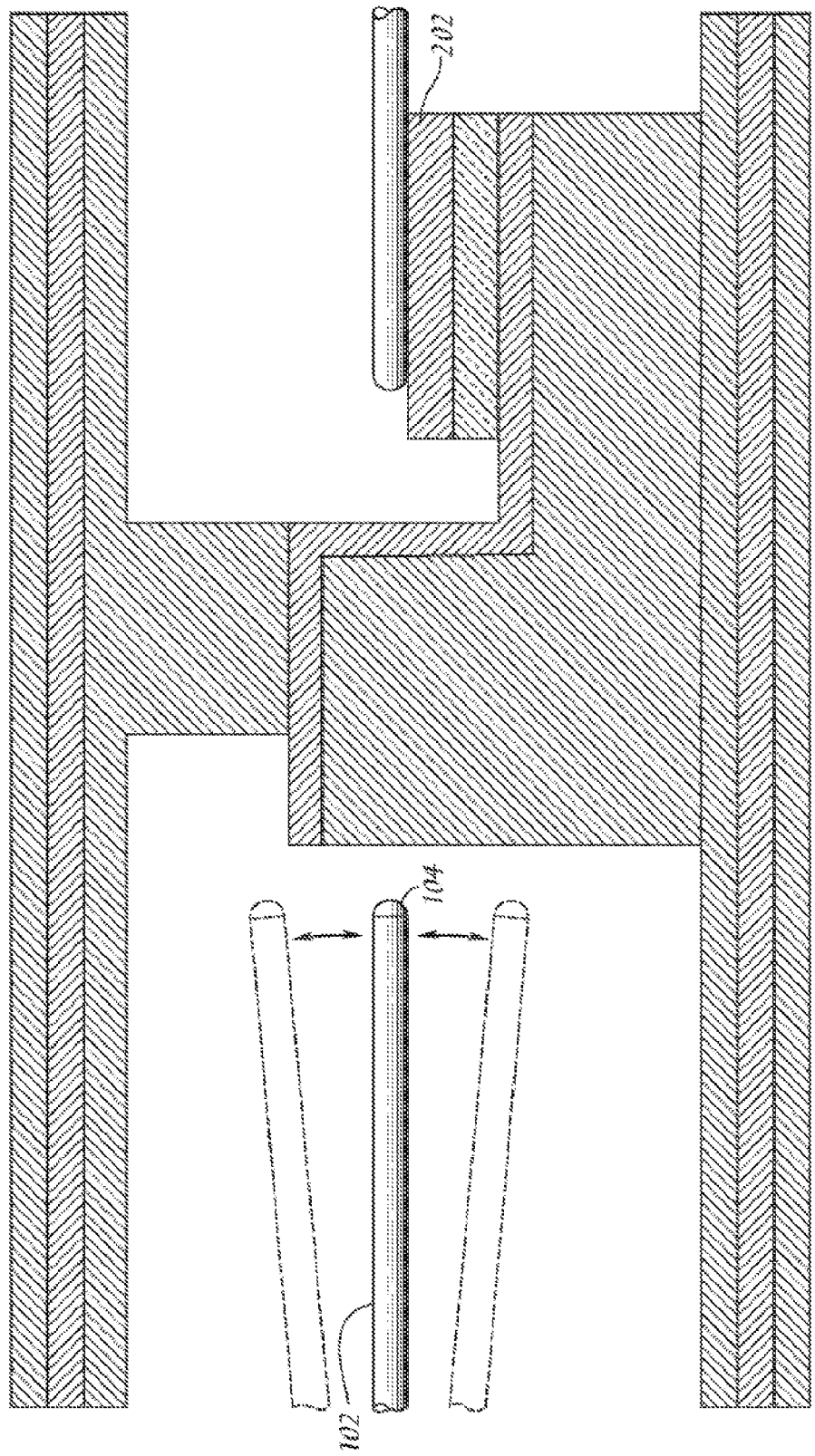

FIG. 2A depicts a parallel series array 200 of tunnel switches 100 that may be used to switch large currents. In some cases, if material 202 is heated, the array 200 can be used to convert heat into a DC voltage/current. Material 202 is a resistive material that generates a small thermal voltage when heated. FIG. 2B shows a close-up of tip 104 of filament 102 in array 200 with conductive traces 112, 114. As shown in FIG. 2B, vertical motion of tip 104 of filament 102 may change the distance between the source tip and the drain trace.

FIG. 3 depicts a tunnel switch device 300 with eight conductive traces 302. The presence of additional conductive traces increases the sensitivity of the device when used as a sensor. As shown in FIG. 3, in some cases the trace edges 304 facing the filament tip can be slightly curved such that the gap between the tip 104 of filament 102 and the traces are substantially constant over the range of tip motion.

Figure 4:
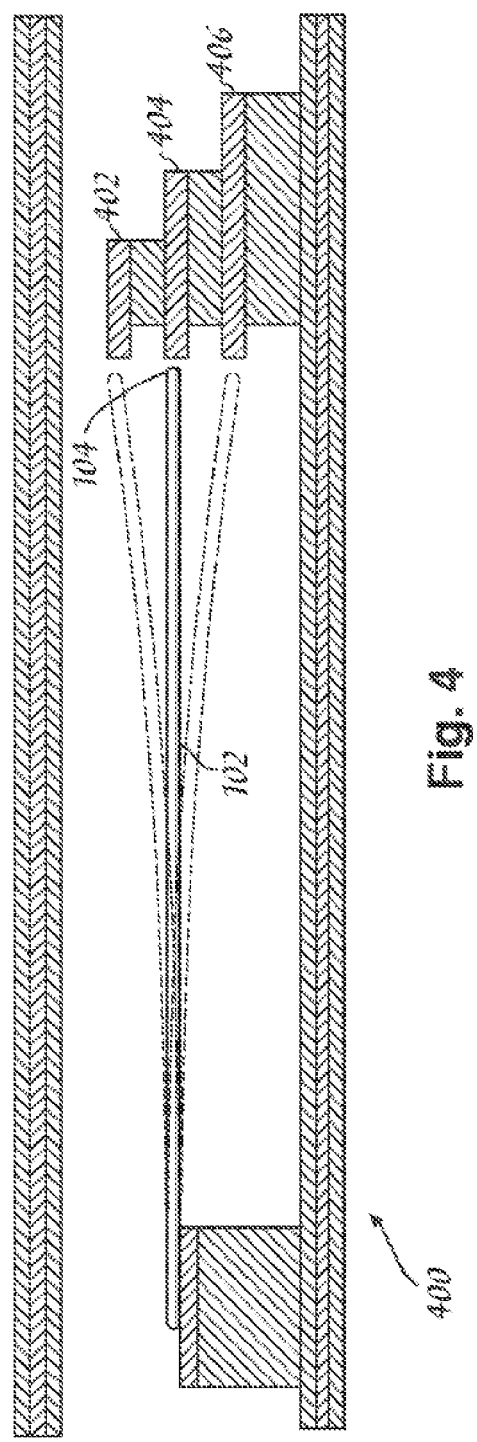
FIG. 4 depicts a nanofilament tunnel current switch with a memory element.

FIG. 4 depicts a tunnel current switch 400 designed to be used as a memory element. If each trace 402, 404, 406 is connected in series with a resistor, a substantial tunnel current will flow through only the resistor that is connected to the trace closest to tip 104 of filament 102 when a voltage is applied to the filament. The filament 102 will tend to center itself near the closest trace due to VDW forces, even when a gate or source voltage is not present. The position of filament tip 104 can be changed by selecting source/gate voltages. Thus, the position of tip 104 can be used to store a given state (e.g., on or off).

Figure 5A:
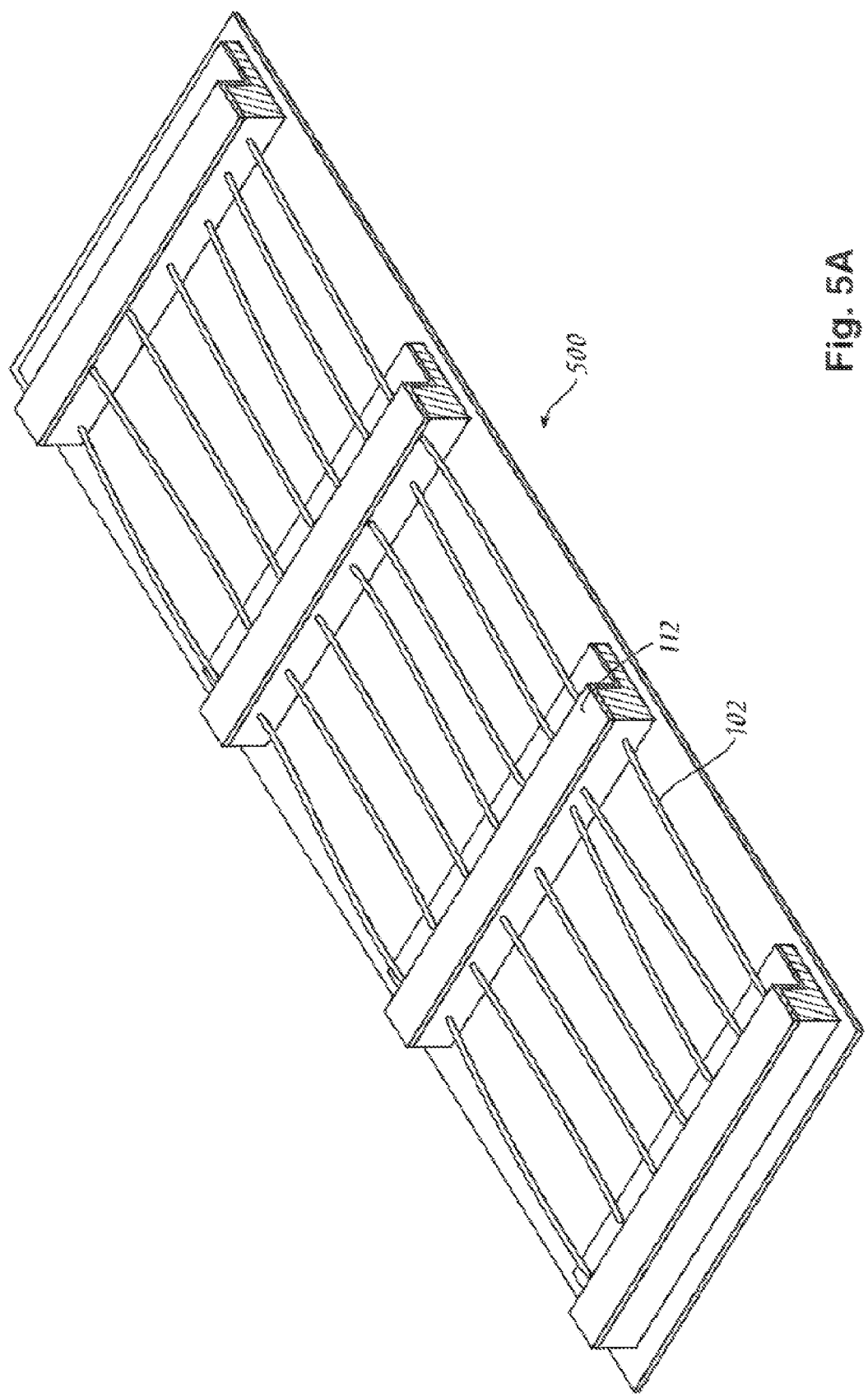

FIG. 5A depicts an array 500 of piezoelectric filaments 102 that can be used to convert heat into a DC output (a "piezoelectric generator array"). Tunnel current is transferred to the conductive trace 112 only when the filament bends upwards, such that all of the filaments provide substantially the same DC polarity. VDW forces may be used to limit extension of the tip 104 above the trace edge. FIG. 5B depicts an enlarged view of motion of filament tip 104 proximate trace 112.

Figure 6A:
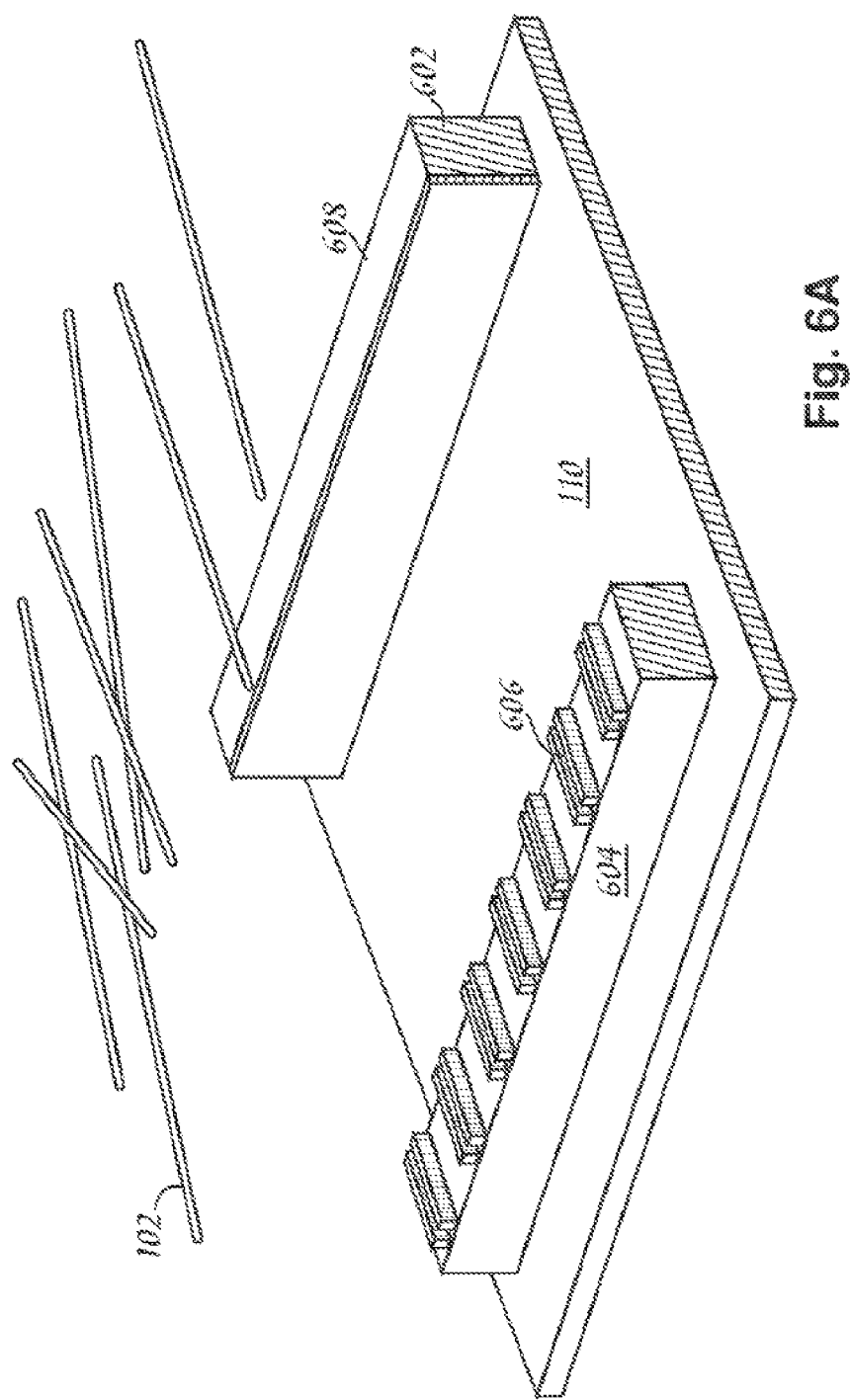
Figure 6B:
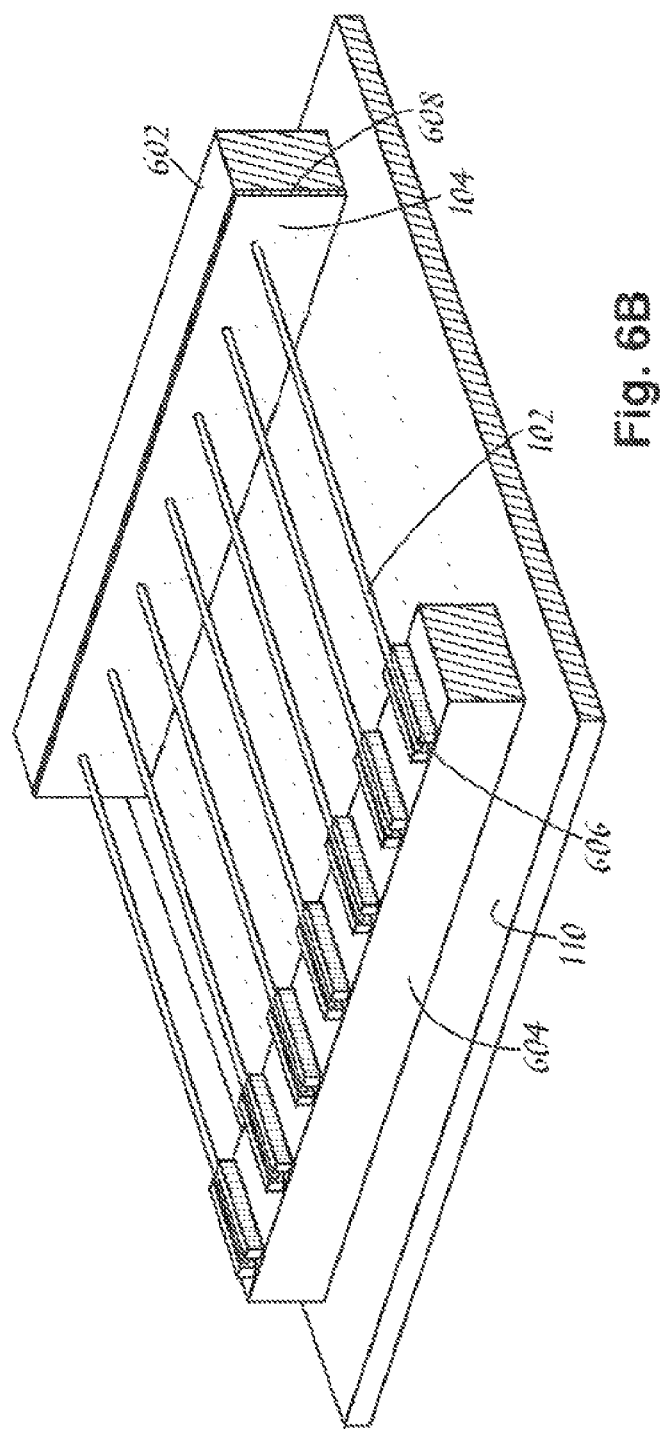

FIGS. 6A-C depict a method of making a tunneling current switch by forming a defined, controllable gap between filament tips and conductive traces. As shown in FIG. 6A, mount 110 includes conductive base 602 and filament base 604. Filament base 604 includes securing elements 606, arranged to secure filaments 102 to filament base 604. Film 608 (which may be one or more sheets of graphene or other thin material) may be temporarily placed on conductive base 602 to form a defined gap between filament tips 104 and conductive base 602.

As shown in FIG. 6B, filaments 102 may be positioned in securing elements 606 such that tips 104 contact film 608. Then, film 608 may be removed from conductive base 602 to leave a predefined gap 118 between tips 104 and the conductive base (or trace), as shown in FIG. 6C.

FIGS. 7A-7H illustrate steps in a process for fabricating a tunneling current switch assembly 700 with tunneling current switches in parallel and series.

FIG. 7A depicts base 702.

Figure 7B:
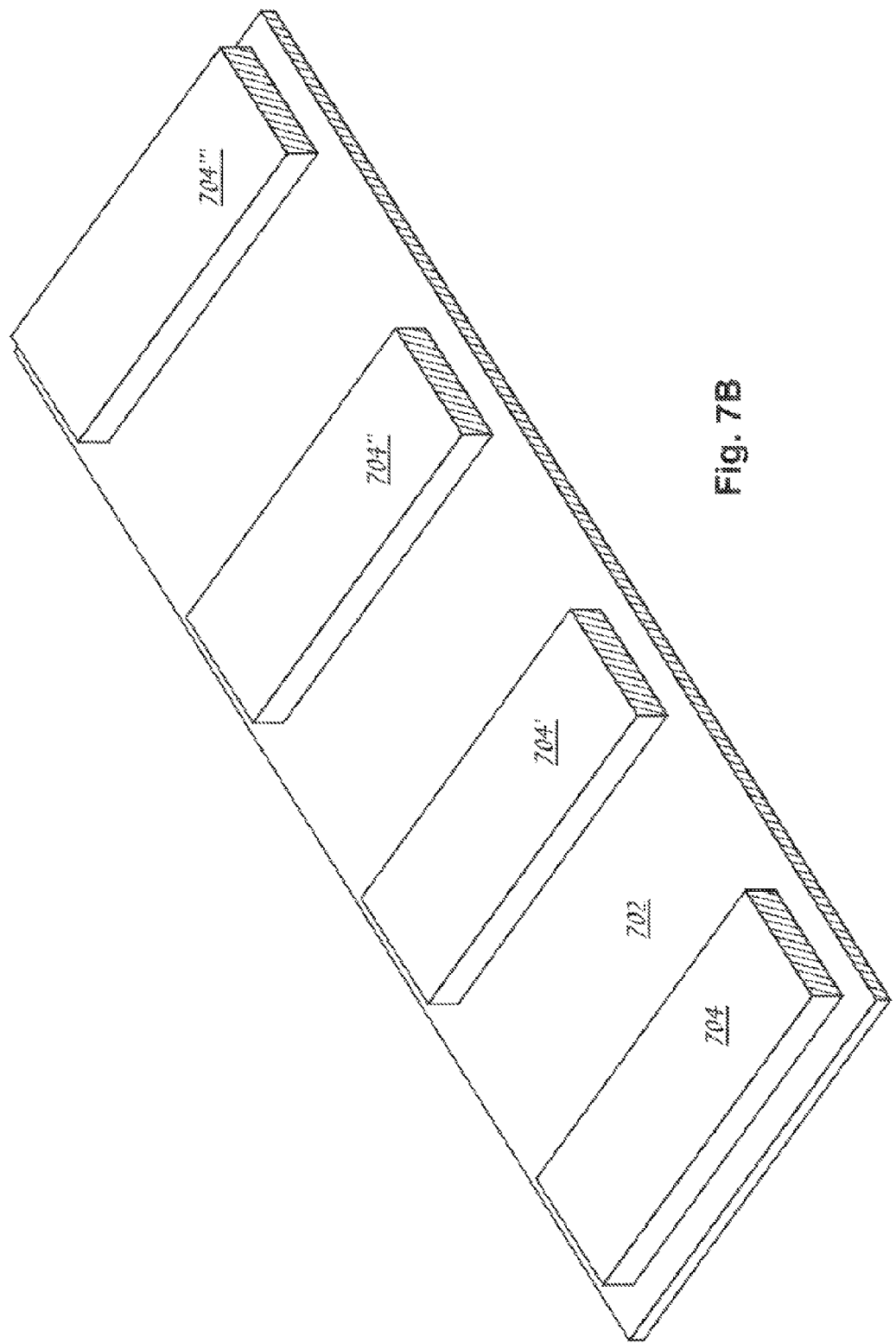

FIG. 7B depicts risers 704, 704', 704", 704''' on base 702.

Figure 7C:
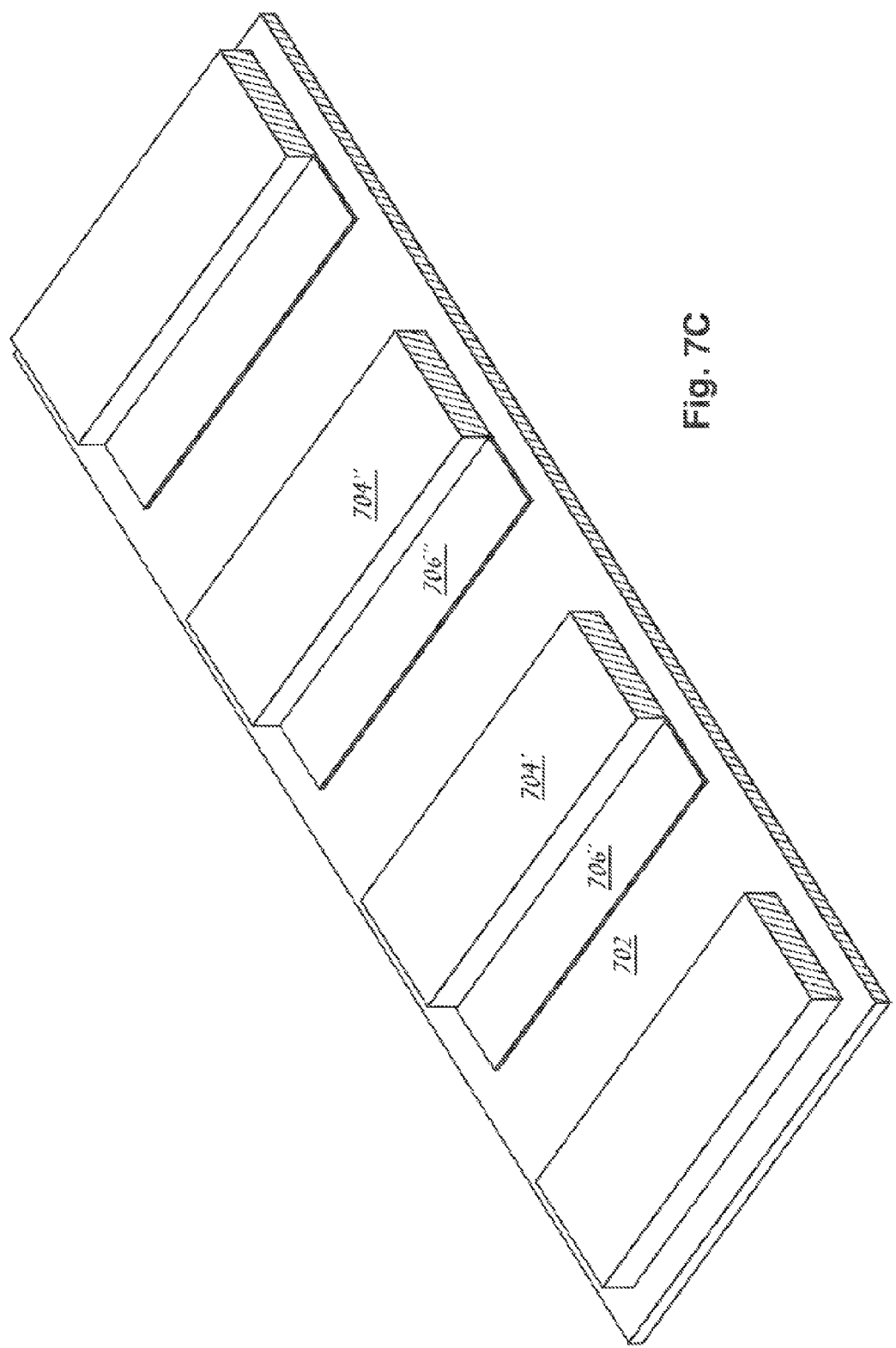

FIG. 7C depicts gate traces 706', 706" etc. proximate risers 704', 704", etc. on base 702.

Figure 7D:
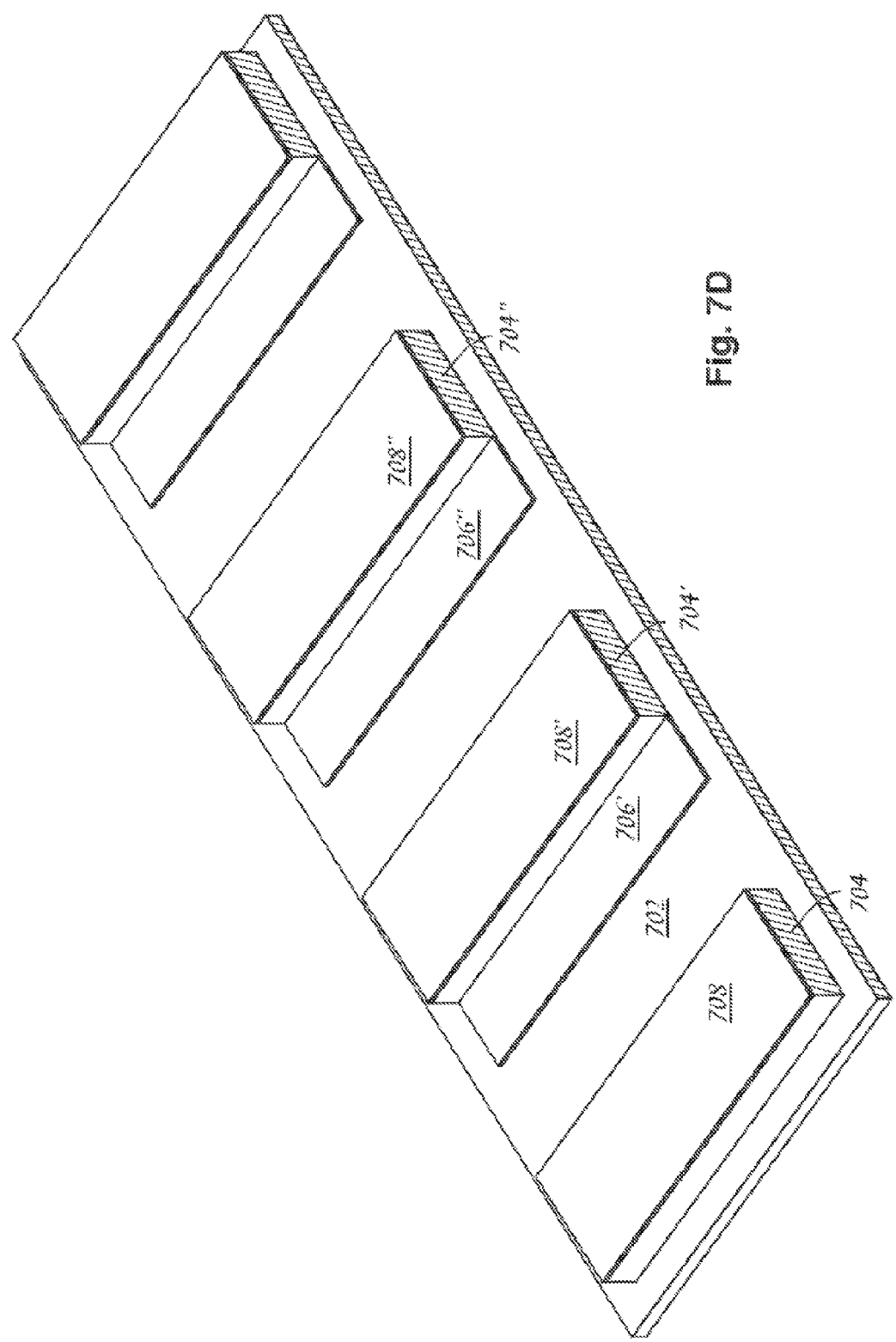

FIG. 7D depicts drain traces 708, 708', etc. on risers 704, 704', etc. Traces 706, 706', etc. and 708, 708', etc. may be formed of conductive material, such as copper.

Figure 7E:
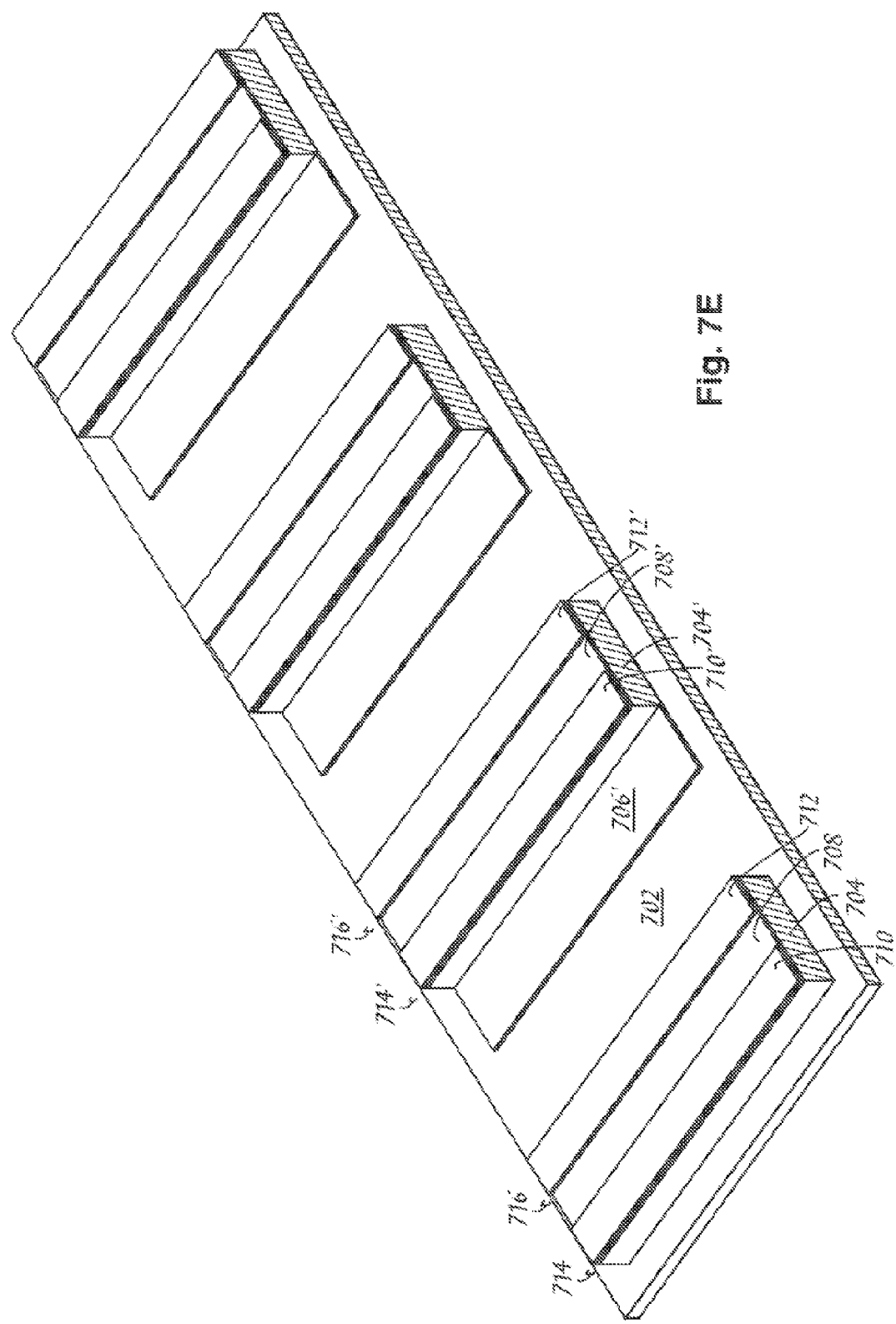

FIG. 7E depicts first layers 710, 710', etc. and 712, 712', etc. of elevated stacks 114, 114', etc. and 716, 716', etc. respectively, formed on traces 708, 708', etc. First layers 710 may be electrical/thermal insulators. If the device is to be used as a power switch, first layers 712, 712', etc. are electrically conductive material. If the device is to be used to convert heat into electricity, first layers 712, 712', etc. are electrically resistive layers.

FIG. 7F depicts support material 718 positioned between risers 704 and 704', 704' and 704", etc. and between elevated stacks 714 and 716, 714' and 716', etc.

FIG. 7G depicts nanofilaments 720 extending from elevated stack 714 to elevated stack 716'''. Nanofilaments 720, which may be applied to a surface in a variety of ways including spin coating, are supported by support material 718 and elevated stacks 714, 714', etc. and 716, 716', etc.

Figure 7H:
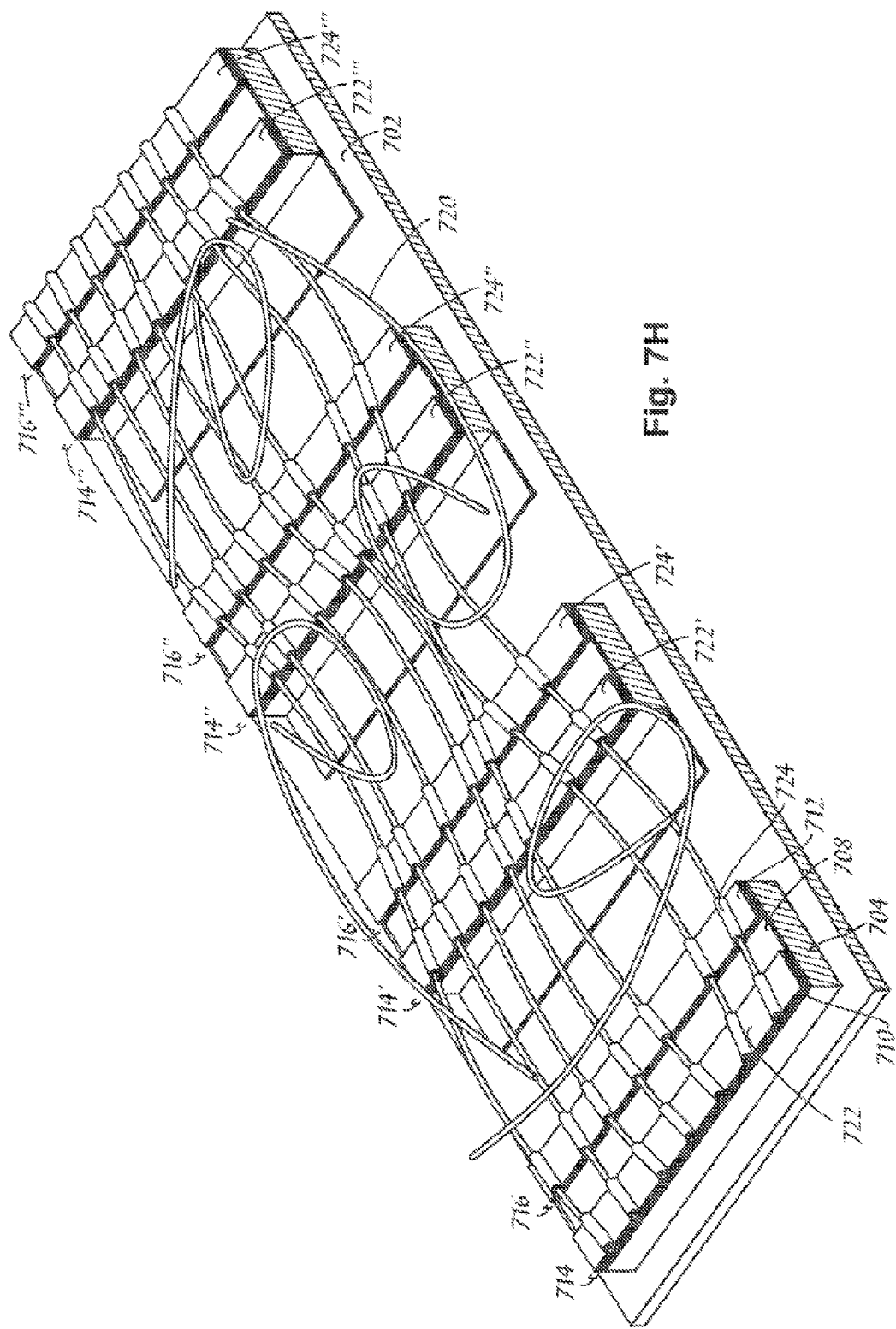

FIG. 7H depicts nanofilaments 720 secured to elevated stacks 714, 714', etc. and 716, 716', etc. with conductive layers 722, 722', etc. and 724, 724', etc., respectively. After the nanofilaments are secured, support material 718 is removed. Conductive layers 722 of elevated stacks 714 are substantially electrically isolated from the main circuit (including traces 708, elevated stacks 716, and nanofilaments 720) by insulating layers 710. In some embodiments, conductive layers 722, 722', etc. may function as drain traces. Conductive layers 724, 724', etc. may function as source traces.

FIG. 8 illustrates gaps 802, 802'. etc. in nanofilament 720 between elevated stacks 714 and 716, 714' and 716', etc. After gaps 802, 802', etc. are formed, nanofilament sections 720', 720", etc. extend between elevated stacks 716 and 714', 716' and 714", etc.

Figure 9:
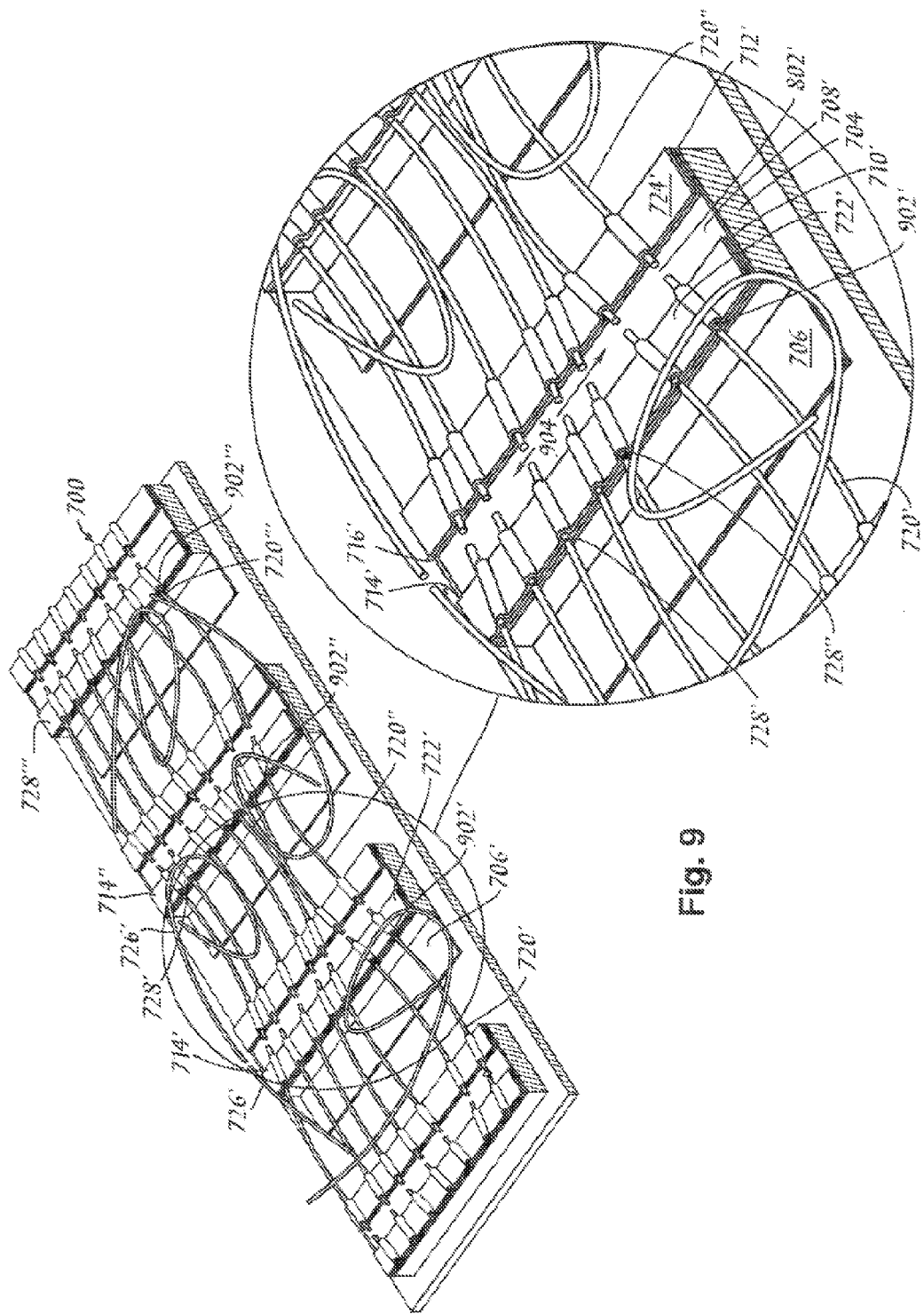
FIG. 9 is a view of a tunneling current switch assembly with an expanded portion.

FIG. 9 illustrates tunneling current switch assembly 700 after formation of tunneling current gaps 902', 902", etc. between nanofilament section 720' and edge 726' of elevated stack 714', nanofilament section 720" and edge 726" of elevated stack 714", etc. In a power switch embodiment, first layers 712 and conductive layers 724 are formed of electrically conductive material, such as copper. In some embodiments, conductive layers 722 of elevated stacks 714 are formed of copper. In other embodiments, conductive layers 722 are formed of tungsten or other high temperature metal conductor.

Gaps 802, 802', etc. in nanofilament 720 between elevated stacks 714 and 716 may be formed by placing a voltage on risers 704 across stacks 714 and 716 (e.g., across conductive layers 722 and 724), and burning or melting the nanofilament to substantially sever the nanofilament. Gaps 902', 902", etc. may be formed by routing a heating current along conductive layers 722 along direction 904, such that conductive layers 722 heat up and weaken nanofilaments 720.

When nanofilaments 720 are weakened sufficiently, the nanofilaments are severed by, for example, burning or melting, proximate edges 726 of elevated stacks 714, creating gaps 902', 902", etc. between the nanofilaments and edges 726. The size of gap 902', 902", etc. may be controlled by varying the magnitude and duration of the current through conductive layers 722. Tunneling current gap 902', 902", etc. may be smaller than gap 802, 802', etc. In some embodiments, gap 902', 902", etc. is less than about 1 nm in length (e.g., between about 2 and about 20 Angstroms in length).

The magnitude of the current through the nanofilament 720 changes as the nanofilament is severed. That is, the magnitude of the current through the nanofilament 720 changes as the conventional current ceases to flow and the tunneling current is established. Gate voltage from traces 706, along with source voltage from conductive layers 716, may be used to push nanofilament sections 720', etc. upward once the nanofilaments are severed. Current feedback through nanofilament sections 720', etc. may be used to control the heating current. The current along conductive layers 722 may be used to create a temperature gradient along the nanofilament sections 720', etc. (e.g., with a higher temperature proximate the conductive layers 722).

In some embodiments, current from elevated stacks 716 (e.g., first layers 712, conductive layers 724, additional layers, or any combination thereof) through the nanofilaments 720 to the conductive layers 722 may be used to enhance/control formation of tunneling gaps 902', 902", etc. This current may serve to increase the temperature of nanofilaments 720 along their length through resistive heating. Because the temperature of nanofilaments 724) may be highest proximate conductive layers 722, the resistive heating of the current along elevated stacks 716 may further increase the temperature proximate conductive layers 722, and facilitate gap formation in the nanofilament proximate conductive layers 722. The current along elevated stacks 716 is self-limiting, since the formation of tunneling gaps 902', 902", etc. reduce this current. This self-limiting characteristic may inhibit damage to nanofilaments 720 beyond severing, and may facilitate formation of a small or minimal tunneling gaps 902', 902", etc.

Change in the current along elevated stacks 716 may also serve as feedback to limit current through the conductive layers 722. Traces 706', 706". etc. may be energized, such that the nanofilament tips 728', 728", etc. move upward (e.g., away from traces 706', etc.) when, for example, trace 706' and the nanofilament segment 720' have a charge of the same polarity. Movement of the nanofilament tip 728' away from the trace 706' following formation of the gap 902' may help control the size of the gap. Tunneling gaps 902', 902", etc, may be further adjusted by using the gate voltage through traces 706 to force the nanofilament tips 728 near the hot conductive layers 722 until the desired gap is attained. That is, the tunneling current through nanofilament sections 720', etc. may be used to provide feedback to control formation of gaps 902', 902", etc.

Once the desired tunneling gaps 902', 902", etc. have been formed, the current through conductive layers 722 may be turned off. Conductive layers 722, which are electrically isolated from traces 708, elevated stacks 716, and nanofilament sections 720', etc., are not used during tunneling switch operation. During switch operation, trace 708' etc. near the nanofilament tip 728' routes tunneling current from the nanofilament tip 728' of nanofilament section 720' to next adjacent nanofilament section 720" and through nanofilament tip 728" to trace 708", etc. The voltage on traces 706', etc. may be used to at least partially determine the distance between nanofilament tips 728', etc. and traces 708', etc.

As described by Kwon et al. in "Thermal Contraction of Carbon Fullerenes and Nanotubes," Phys. Rev. Let. 92(1) 015901-1-015901-4 (2004) (which is hereby incorporated herein by reference), the thermal expansion coefficient for some carbon nanotubes is negative up to around 1300 K before becoming positive. That is, a carbon nanotube shrinks as it is heated up to about 1300 K, above which temperature the nanotube expands as it is heated.

This temporary thermal expansion may be used to expand the nanofilament beyond its room temperature length in a process to shorten a nanofilament and thus increase the tunneling current gap 902'. Methods such as heating elevated stack 714 below the fixed portion of the nanofilaments 720, heating the nanofilament with a laser, other methods, or any combination thereof may be used to expand the nanofilament before adjusting the size of the tunneling current gap 992'. For example, if the tunneling gap 902' is too small, nanofilament sections 720' etc. may be heated to temporarily increase their length, causing the nanofilament tips 728', etc. to touch hot conductive layers 722', etc. such that nanofilament material at nanofilament tips 728', etc. is burned or otherwise removed from the tips 728', etc.

After nanofilament sections 720', etc. are allowed to cool, they will contract in length, leaving shorter nanofilament sections, etc. (i.e., larger tunneling gaps 902', 902", etc.).

Figure 10:
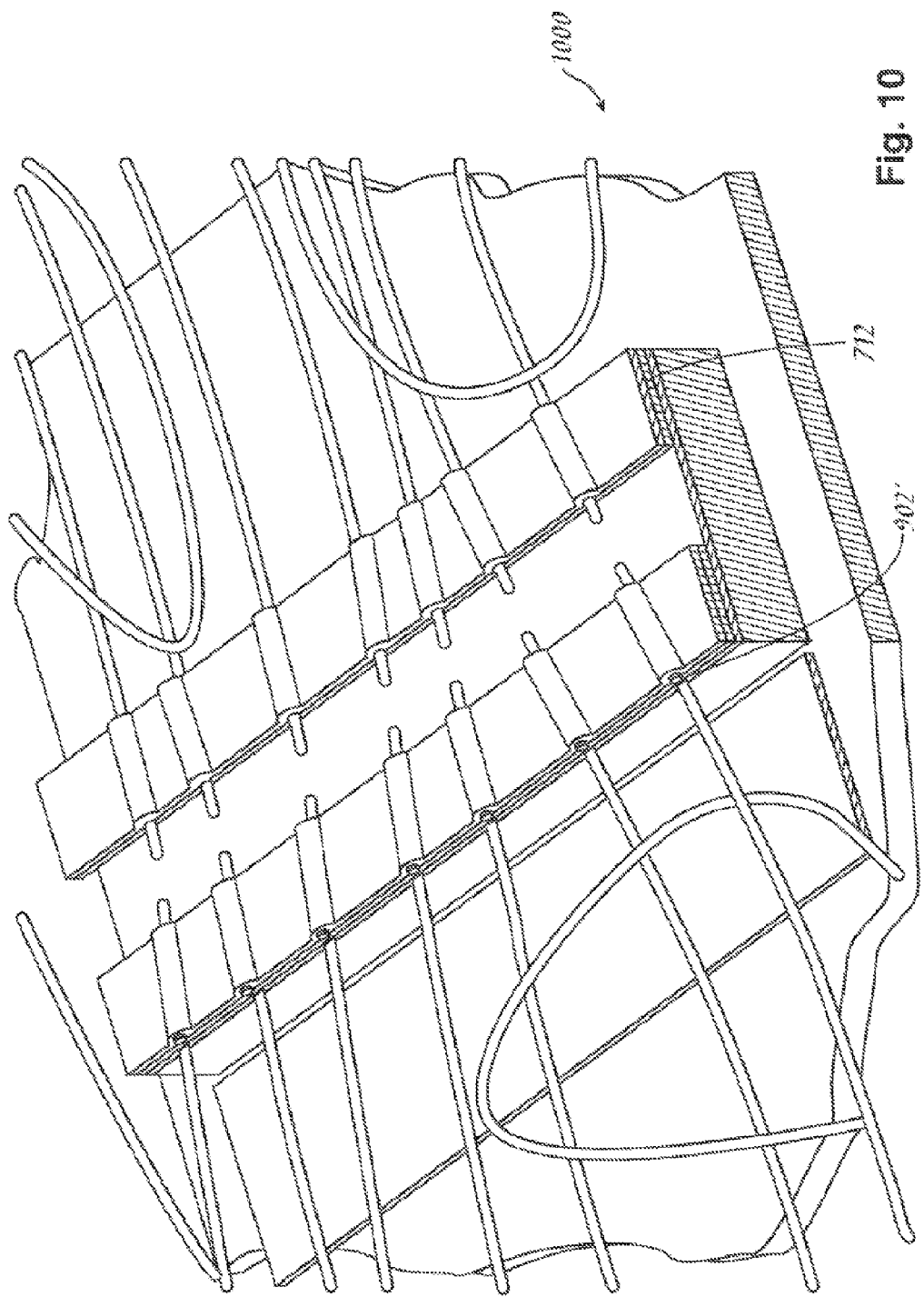
FIG. 10 is a view of a portion of a tunneling current switch assembly.

FIG. 10 illustrates an embodiment of a portion of tunneling current switch assembly 1000 that may be used to convert heat into electricity. In tunneling current switch assembly 1000, first layer 712 includes electrically resistive material. When first layer 712 is heated (e.g., by the sun or some other source of heat), this resistive layer generates a thermal noise (i.e., Johnson noise) voltage that may be rectified and summed by the tunneling current switch assembly 1000. Unlike silicon-based rectifiers, tunneling current switch assemblies 1000 are capable of rectifying thermal noise voltages as low as a few micro-volts. Thus, tunneling current switch assembly 1000 may be used to convert solar heat into a useable DC voltage/current. Tunneling current switch assembly 1000 may achieve this conversion at lower cost and with higher efficiency than photovoltaic and solar thermal devices.

During operation of a tunneling current switch assembly, the tunneling current through the nanofilament will cause resistive heating and, as a result of the negative temperature coefficient for T<1300 K, the tunneling gap 902' will increase and thus decrease the nanofilament current or heating. When operating a multiplicity of tunneling current switches in parallel, a nanofilament with a tunneling current gap smaller than average will transmit a high current, heat up more than the nanofilaments with larger gaps, and contract. When the nanofilament contracts, the gap increases, thus decreasing the current from this switch to a value closer to that of switches with average gaps. If another switch has a gap with an average length, the switch may transmit an average current. The nanofilament may not heat up more than the average nanofilament, and the gap may not increase substantially.

The negative temperature coefficient for T<1300 K may also allow nanofilament sections that are still touching edge 726 of elevated stack 714 to heat up, contract, and establish a small/efficient tunneling current gap 902'. Current flowing through the nanofilament may thus transform from resistive to tunneling as the nanofilaments warm up. In some embodiments, nanofilaments in a tunneling current switch may be severed such that a multiplicity of the nanofilaments touch the conductive layer 722 at ambient temperature, and establish tunneling gaps as the nanofilaments shrink during operation.

In some embodiments, a tunneling current gap may be established and controlled by heating the switch assembly (e.g., with a heater) to a given temperature. For example, for a nanofilament section 720' with its cantilevered end in contact with conductive layer 722' and its secured end fixed to conductive layer 724, a temperature increase from 27° C. to 70° C. may decrease the length of a 500 nm carbon nanotube by 0.24 nm, thus opening up a 0.24 nm tunneling current gap between nanofilament tip 728' and conductive layer 722'. In some embodiments, a resistive heater coupled to tunneling current switch assembly 1000 may be used to maintain or adjust the temperature of nanofilament sections 720', etc, based on feedback, for example, from a thermistor, the nanofilament tunneling current (for a given voltage), or other parameter or combination of parameters. Even with manufacturing or dimension defects, if a multiplicity of parallel nanofilaments, 500 nm in length, were initially touching conductive layer 722' at an ambient temperature of 27° C., the nanofilaments would form a 0.24 nm tunneling gap when heated to 70° C. Thus, controlled heating of nanofilaments may promote the formation of accurate and precise tunneling gaps for a multiplicity of substantially parallel carbon nanotubes.

Figure 11:
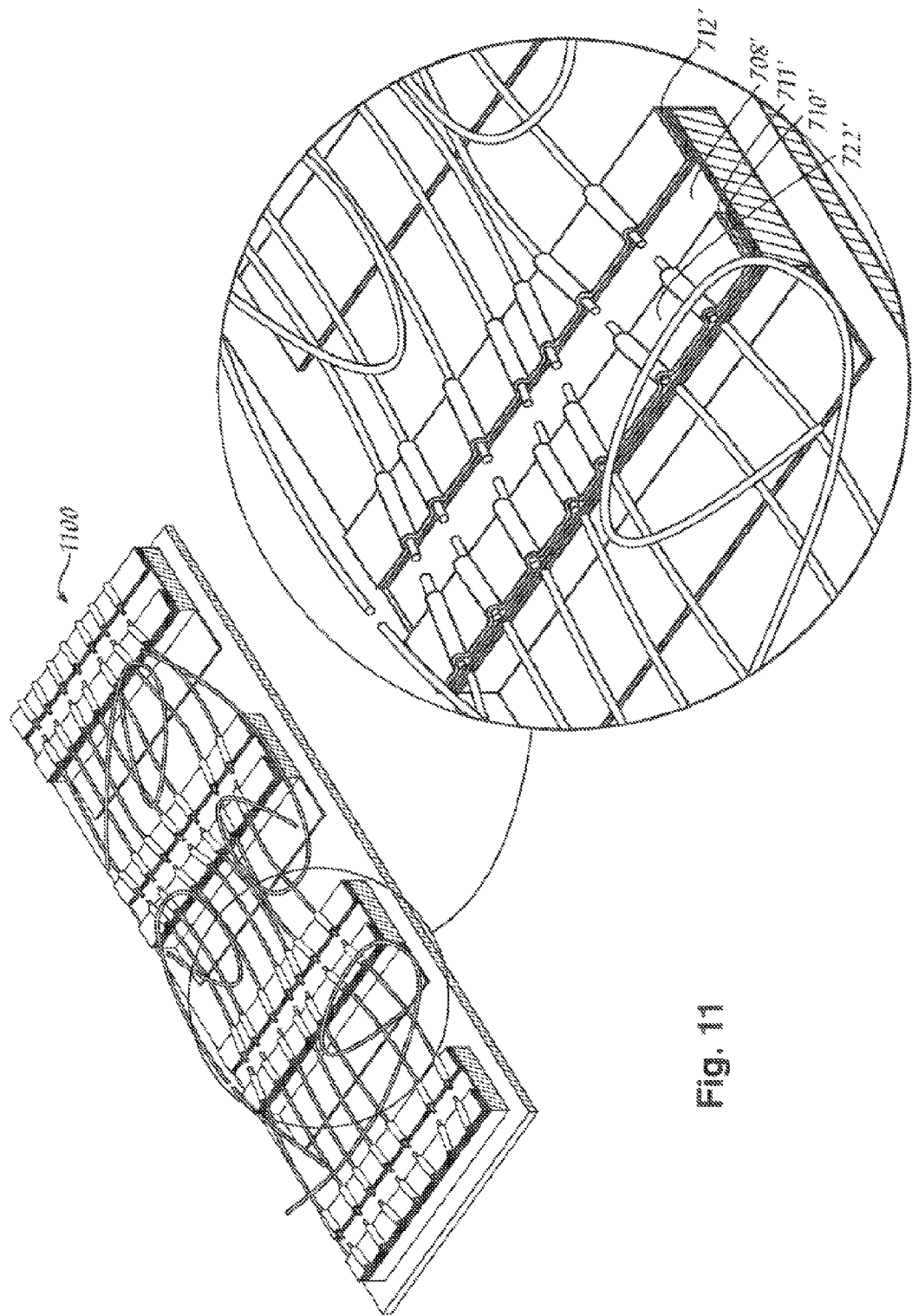
FIG. 11 is a view of a tunneling current switch assembly with an expanded portion.

In the embodiment of tunneling switch assembly 1100 illustrated in FIG. 11, elevated stacks 714, 714', etc. include resistive first layers 710, 710', etc. and resistive second layers 711, 711', etc. between traces 708, 708', etc. and conductive layers 722, 722', etc. During fabrication, nanofilaments 720 are deposited on resistive first layers 710 (and first layers 712), and secured with resistive second layers 711, 711', etc. Conductive layers 722, 722', etc. are then deposited on resistive second layers 711, 711', etc. To create tunneling gaps 902', 902'', etc. a voltage is placed across trace 708 and conductive layer 722, trace 708' and conductive layer 722', etc. such that, for example, current flows from trace 708 through first layer 710 and second layer 711 to sever the nanofilaments 720 at edge 726 of trace 714.

For embodiments of tunneling switch assembly 1100 used as a power switch, first layers 712, 712', etc. are electrically conductive. For embodiments of tunneling switch assembly 1100 used to convert heat into electricity, second layers 712, 712', etc. are electrically resistive. When heated, resistive second layers 712, 712', etc. create small voltages that are rectified with the nanofilament switches to create a DC output.

In some embodiments, the tunneling voltage across tunneling gap 902' may be about 10 volts or less. A multiplicity of parallel arrays may be placed in series to switch higher voltages (e.g., 480 VAC). These tunneling current switch assemblies may be used, for example, to replace semiconductor power switches such as insulated gate bipolar transistors in devices such as electric/hybrid cars, photovoltaic arrays, wind turbines, variable speed drives, computer power supplies and the like.

Embodiments of nanoelectromechanical nanofilament pump assemblies described and illustrated herein demonstrate the use of thermally generated power to create or enhance fluid flow. Heat can be supplied by, for example, an ambient environment, the sun, a hot microchip, burning fuel, etc. The fluid flow can be converted to other forms of energy such as, for example, mechanical energy or electricity, with output increasing with increased thermal and/or electrical input. An array of nanofilament pump assemblies can also be used to convert heat or electricity into thrust to accelerate and control a vehicle such as an automobile or an aircraft.

Figure 12:
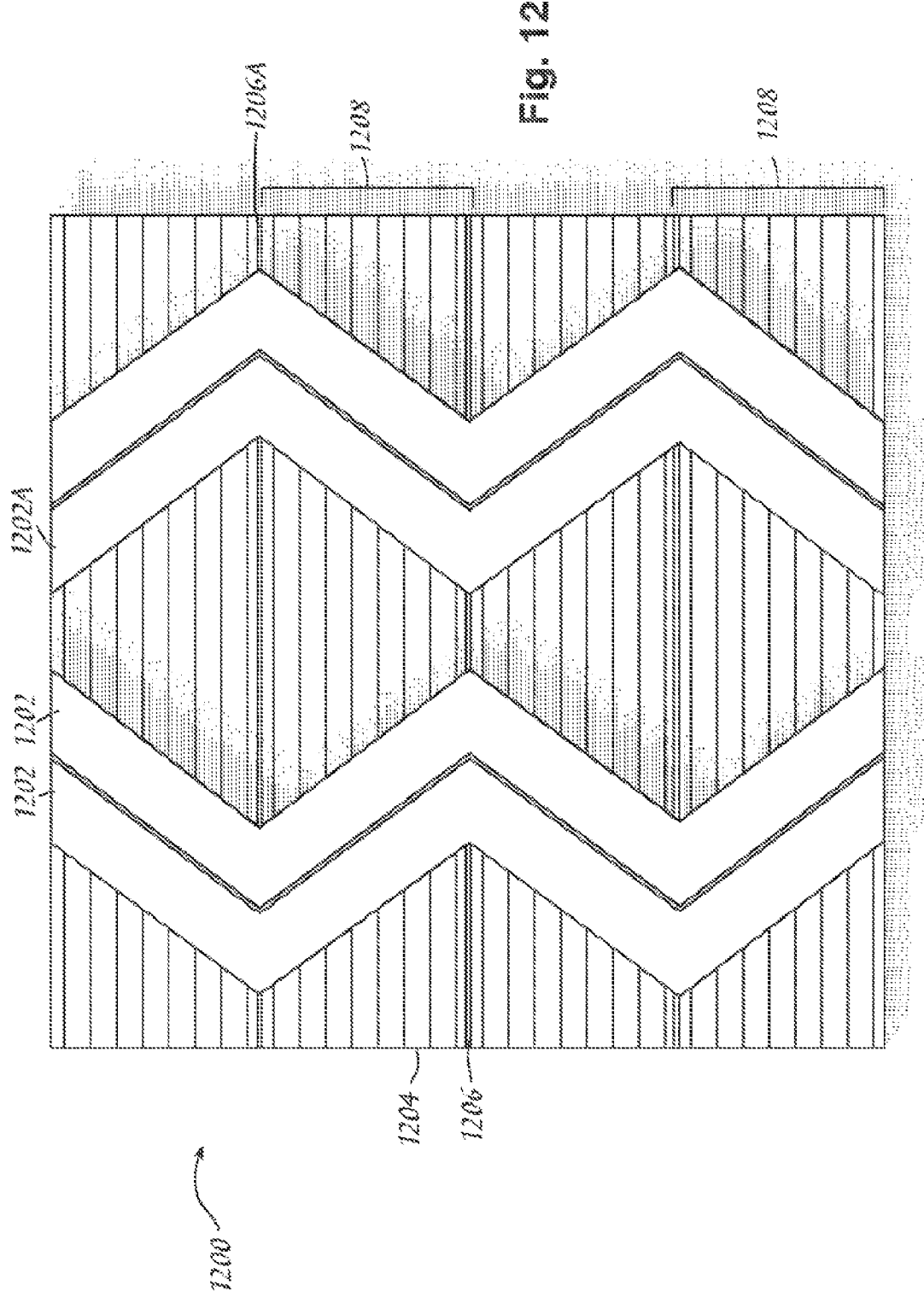
FIG. 12 illustrates a nanoelectromechanical switch assembly.

FIG. 12 illustrates an embodiment of a nanoelectromechanical tunneling current switch assembly 1200. Switch assembly 1200 can be used in applications including, for example, non-volatile memory, sensors, microprocessors, and the like. Switch assembly 1200 allows carbon nanotubes to be addressed individually using relatively large conductive traces. The traces may be fabricated in a semiconductor facility, such that an increase (e.g., about 100-fold) in the number of switches per unit area may be achieved relative to state-of-the-art silicon devices.

In FIG. 12, the source and drain traces 1202 are angled such that each carbon nanotube 1204 differs in length from adjacent carbon nanotubes. Gate traces 1206 run substantially the same direction as the carbon nanotubes 1204. Cell 1208 includes one gate trace 1206, one source/drain trace pair, and associated carbon nanotubes 1204. A switch assembly 1200 may include a multiplicity of cells 1208. Each cell 1208 may include a multiplicity of carbon nanotubes 1204 (e.g., 100). For clarity, FIG. 12 shows four cells 1208 with 8 carbon nanotubes per cell.

Figure 13:
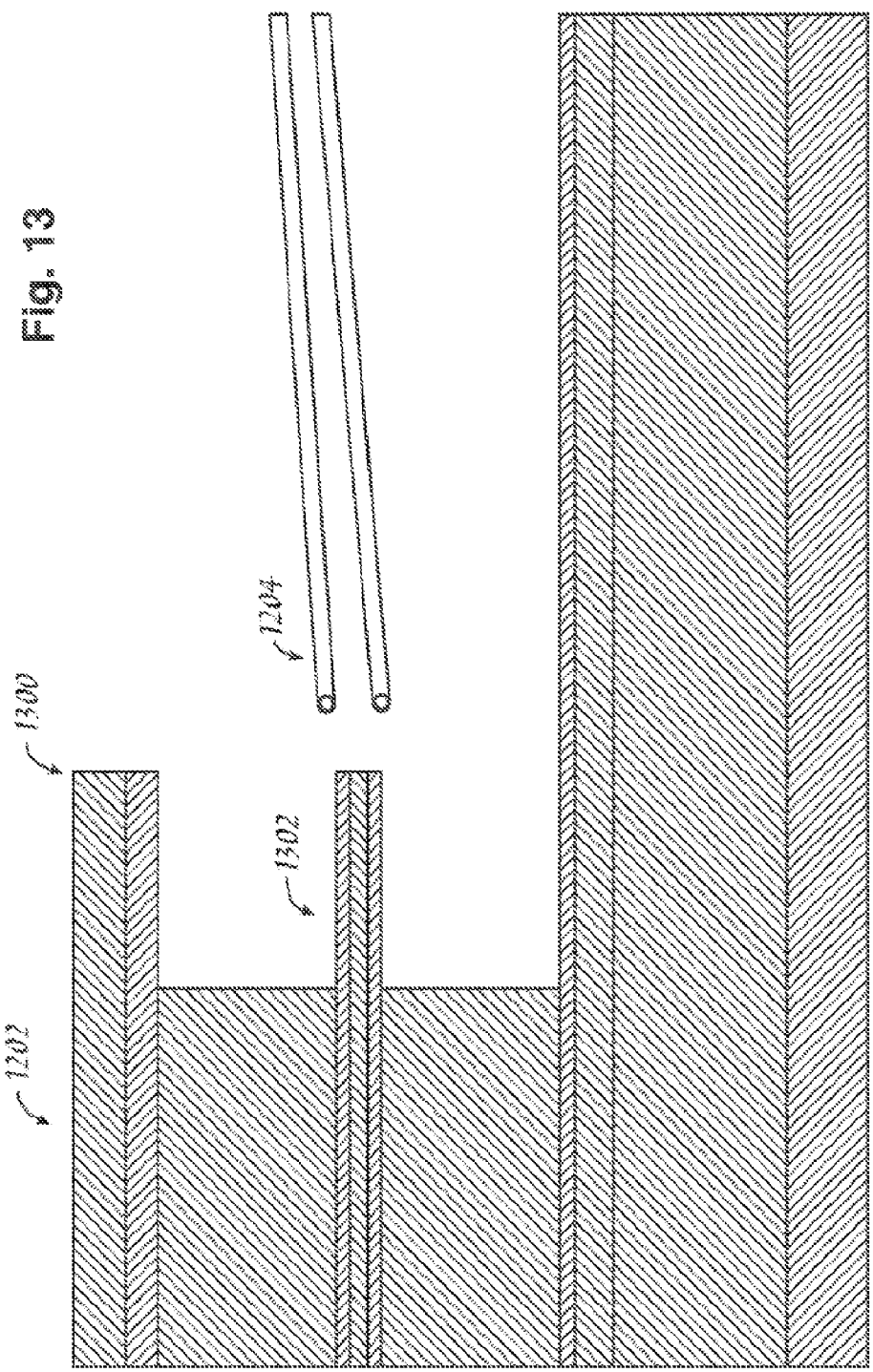
FIG. 13 illustrates a side view of a portion of the switch assembly shown in FIG. 12.

FIG. 13 shows a side view of a portion of switch assembly 1200. Source/drain trace 1202 has protrusions 1300 and 1302, with conducting and insulating layers. The tip of carbon nanotube 1204 is shown coupled to lower protrusion 1302 via attractive van der Waals forces. If the protrusion 1302 represents a logical "off" state, the carbon nanotube 1304 will be in a logical "on" state when it is coupled to (e.g., proximate) the upper protrusion 1300. To determine if a given carbon nanotube 1204 is in an "on" state, one source trace 1202 (e.g., angled trace 1202A in FIG. 12) is energized with a DC voltage, and the gate trace 1206A below this carbon nanotube is energized with an opposite DC voltage. The voltage application pulls the carbon nanotubes 1204 within a cell 1208 slightly downward so that the carbon nanotube tips are proximate conductive trace 1606 of the upper protrusion 1300. A time-varying tunneling current (e.g., due to thermal oscillations of each carbon nanotube tip) can be read from trace 1306 of the upper protrusion 1300. Even though all the carbon nanotubes within a given cell 1208 are generating time-varying tunneling currents, each carbon nanotube 1204 is oscillating at its own mechanical resonant frequency due to the differences in carbon nanotube lengths within one cell. That is, resonant frequency varies as the inverse square of carbon nanotube length. A simple circuit connected to drain trace 1202 can resolve the different frequencies in a combined signal and thus determine which carbon nanotubes are "on" and which are "off." If a certain frequency signal is absent, the associated carbon nanotube is thought to be in an "off" position.

To switch a given carbon nanotube 1204 between on/off states, a DC signal is applied to the gate trace 1206 and an AC signal is applied to the source trace 1202. In some cases, DC may be applied to source trace 1202 and AC to may be applied to gate trace 1206. The AC may have an electrical frequency substantially equal to the mechanical resonant frequency of the carbon nanotube within a given cell that is selected to switch states. After a length of time, the target carbon nanotube 1204 may oscillate with a large enough amplitude to escape the van der Waals attraction of one protrusion (e.g., 1300) and be captured by the other protrusion (e.g., 1302).

As described herein, this tunneling current switch may be used as a molecular mass sensor. That is, as airborne molecules land on a given carbon nanotube, the added mass will change the mechanical resonant frequency; this change in frequency can be read through the tunneling current. With an array of a multiplicity of carbon nanotubes (e.g., mil lions of nanotubes), a given substance or group of substances may be sensed rapidly. In an example, a disease could be rapidly sensed from the breath of a person if a characteristic molecule is detected by a switch assembly. Based on factors including but not limited to tunneling current readout, self generated thermal oscillations, small carbon nanotube size, number of carbon nanotubes on a chip, room temperature operation under ambient conditions, a nanoelectromechanical tunneling current switch assembly provide high sensitivity at low cost.

Figure 14:
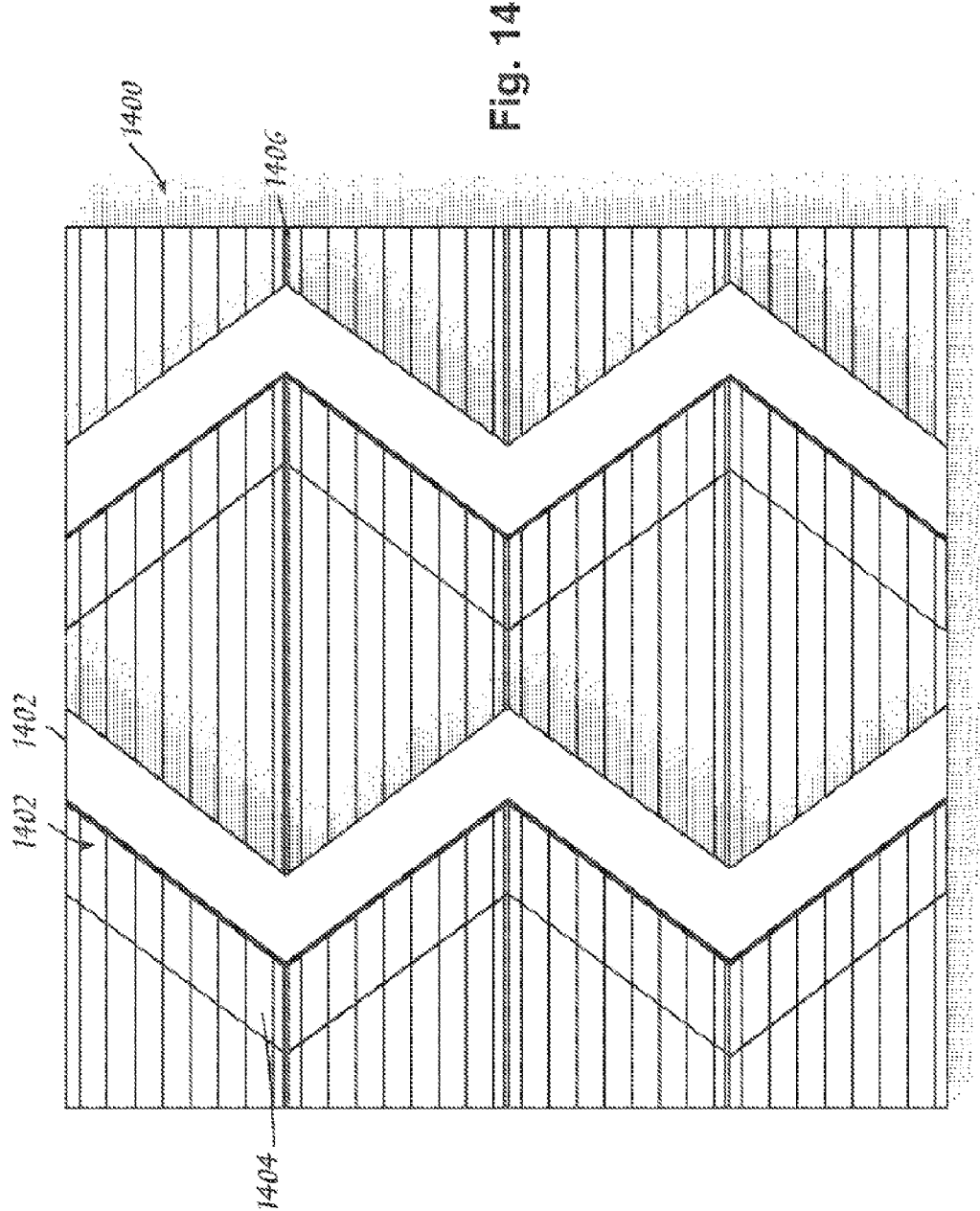
FIG. 14 illustrates a nanoelectromechanical switch assembly.

FIG. 14 shows an embodiment of another nanoelectromechanical switch assembly 1400 with source/drain traces 1402, carbon nanotubes 1404, and gate traces 1406.

Figure 15:
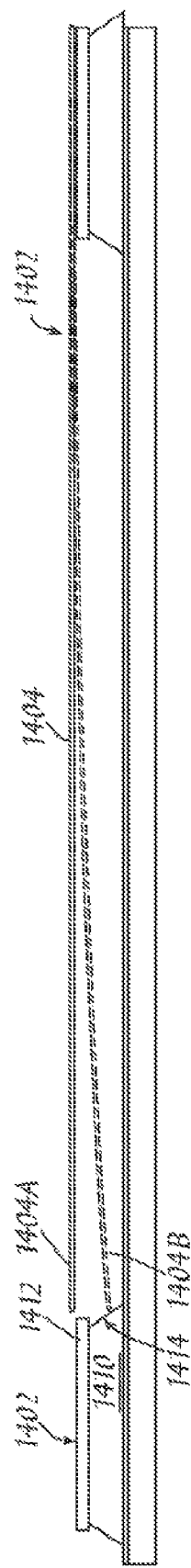
FIG. 15 illustrates a side view of a portion of the switch assembly shown in FIG. 14.

FIG. 15 shows a side view of a portion of nanoelectromechanical switch assembly 1400 with carbon nanotube 1404 extending between source/drain traces 1402. When the carbon nanotube tip is touching insulating material 1410, and thus is coupled in place with van der Waals forces, the switch is "off." When the carbon nanotube tip is facing (e.g., proximate) metallic trace 1412, it is "on." To activate one of the carbon nanotube switches (e.g., from off to on), a same polarity voltage may be applied to carbon nanotube 1404 and its associated gate trace 1406, thus effectively pushing the carbon nanotube tip off ledge 1414 with electric repulsion forces. To switch one of the carbon nanotube switches from on to off, a DC voltage may be placed on the carbon nanotube 1404 while the associated gate trace 1406 is energized with AC at an electrical resonance frequency near the mechanical resonance frequency of the carbon nanotube, thus creating a mechanical oscillation large enough for carbon nanotube tip to touch the insulator wall 1414.

Figure 16:
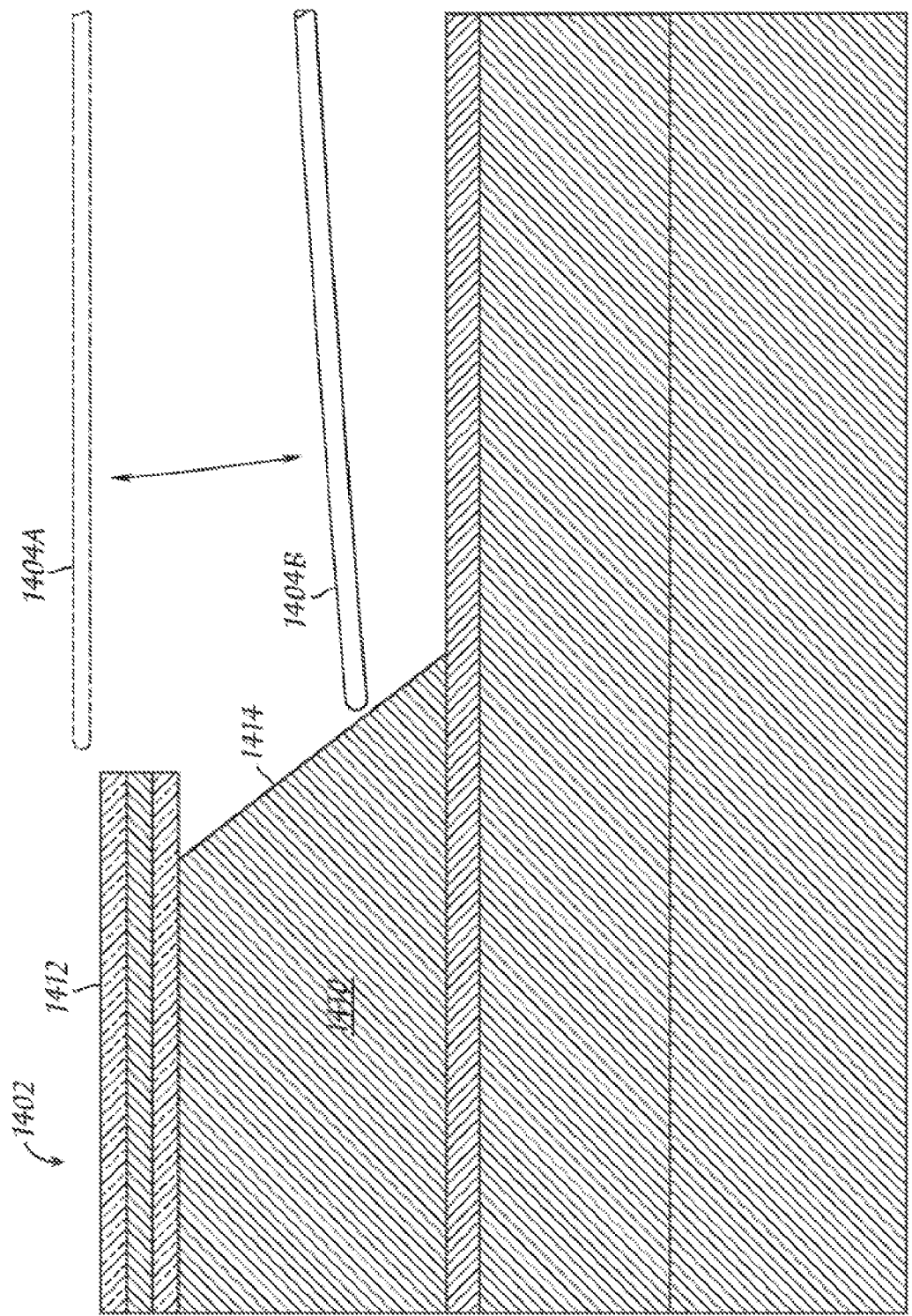
FIG. 16 illustrates an enlarged portion of FIG. 15.

FIG. 16 shows an enlarged view of the tip of carbon nanotube 1404 in the on position 1404A, proximate conductive trace 1412, and in the off position 1404B, proximate insulating layer 1410.

FIGS. 17-21 illustrate steps in a process to fabricate an array of nanoelectromechanical tunneling current switches and associated small tunneling gaps.

Figure 17:
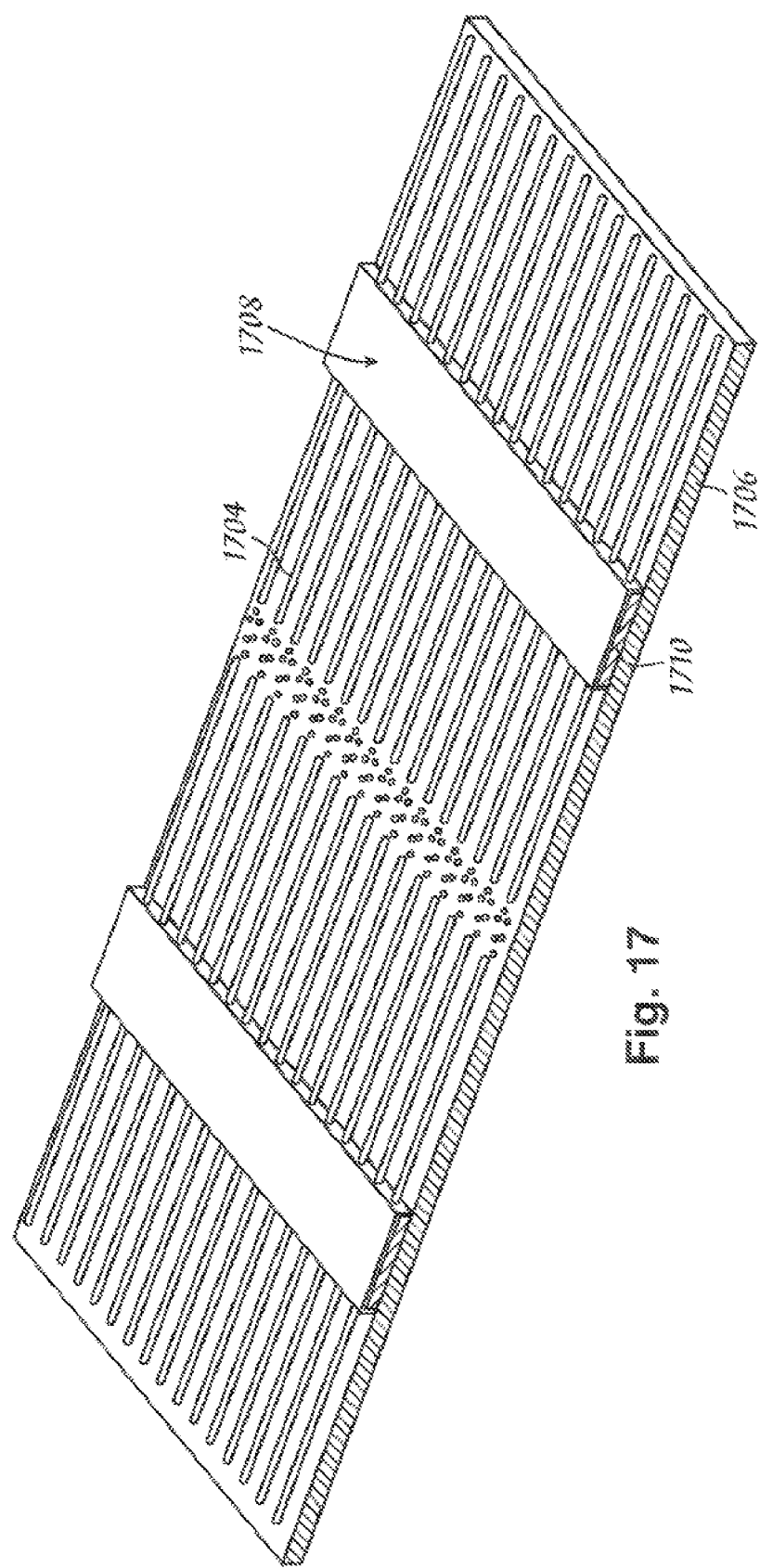
FIGS. 17-21 illustrate steps in a process to form a nanoelectromechanical switch assembly.

FIG. 17 shows growth of carbon nanotubes 1704 from metallic catalyst particles (e.g., using chemical vapor deposition) on substrate 1706. Substrate 1706 may be, for example, quartz or sapphire. The carbon nanotubes are allowed to grow in length until they contact coating 1718 on metallic trace 1710. A thickness of coating 1708 may be selected based a desired width of the tunneling gap to be formed between carbon nanotubes 1704 and metallic trace 1710.

Figure 18:
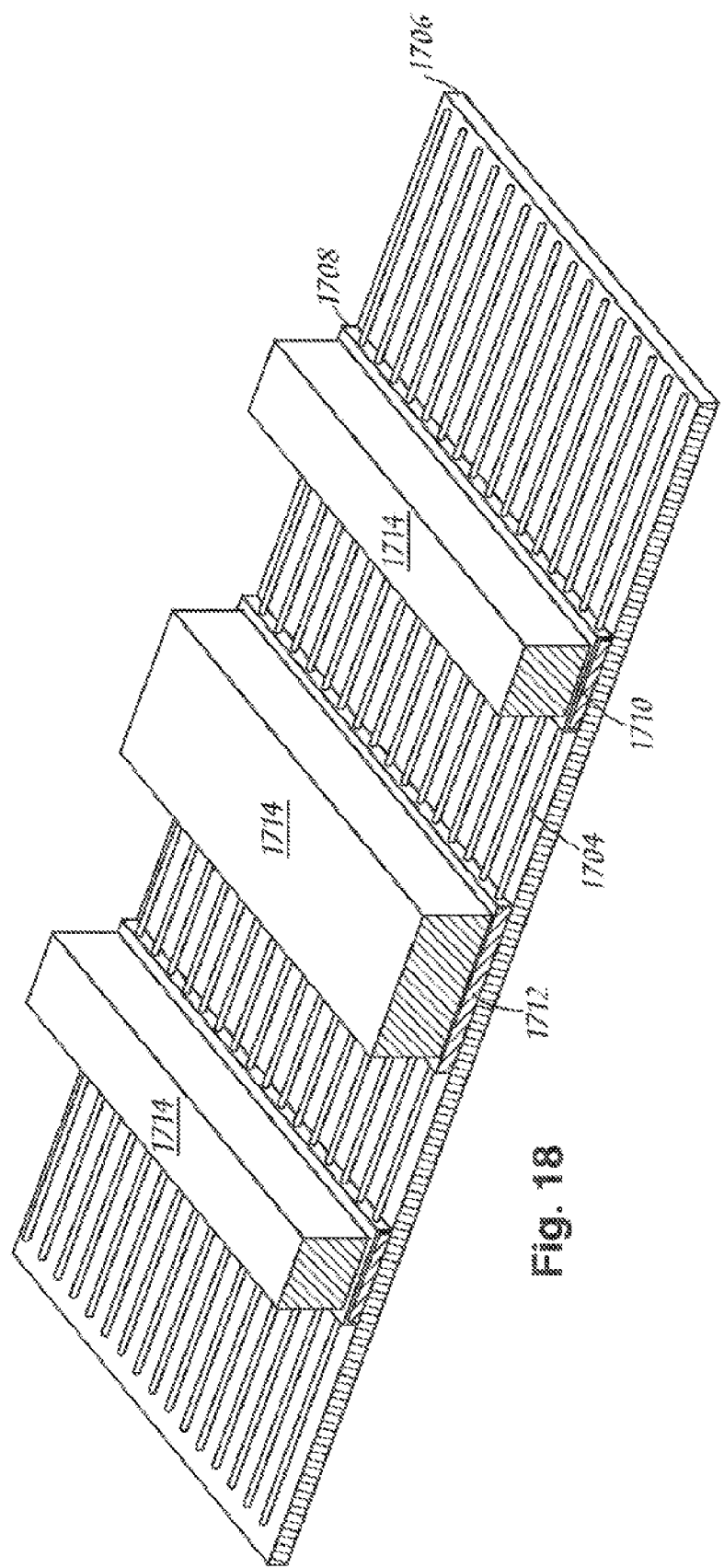

FIG. 18 shows fully grown carbon nanotubes 1704 on substrate 1706. Conductive trace 1712 is formed on substrate 1706 to secure carbon nanotubes 1704. Insulating traces 1714 are formed on conductive traces 1710 and 1712.

Figure 19:
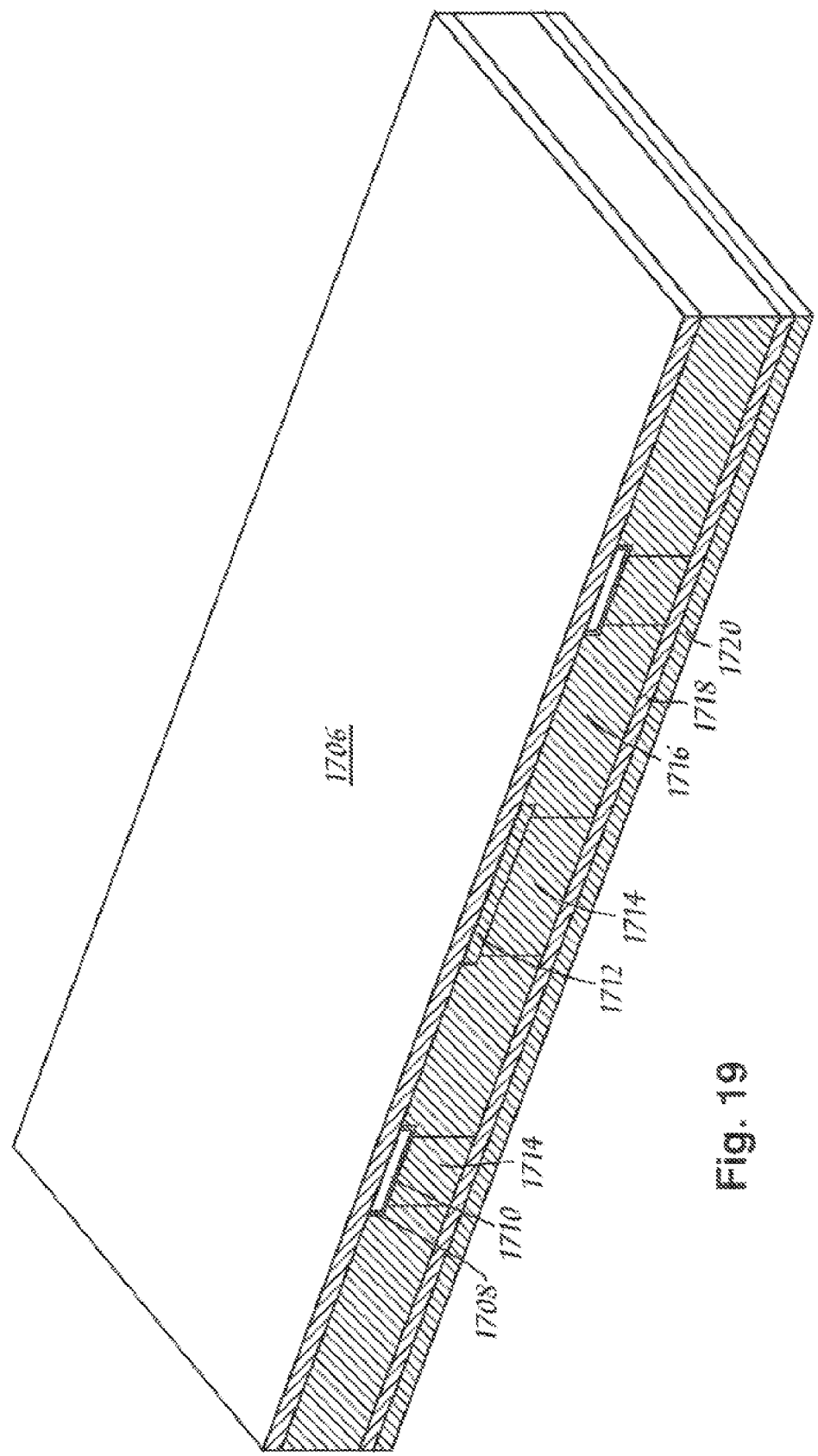

FIG. 19 shows substrate 1706 (inverted with respect to FIG. 18) with filler 1716 between insulating traces 1714. Conductive layer 1718 is deposited on exposed surfaces of insulating traces 1714 and filler 1716. Support layer 1720 is deposited on conductive layer 1718.

Figure 20:
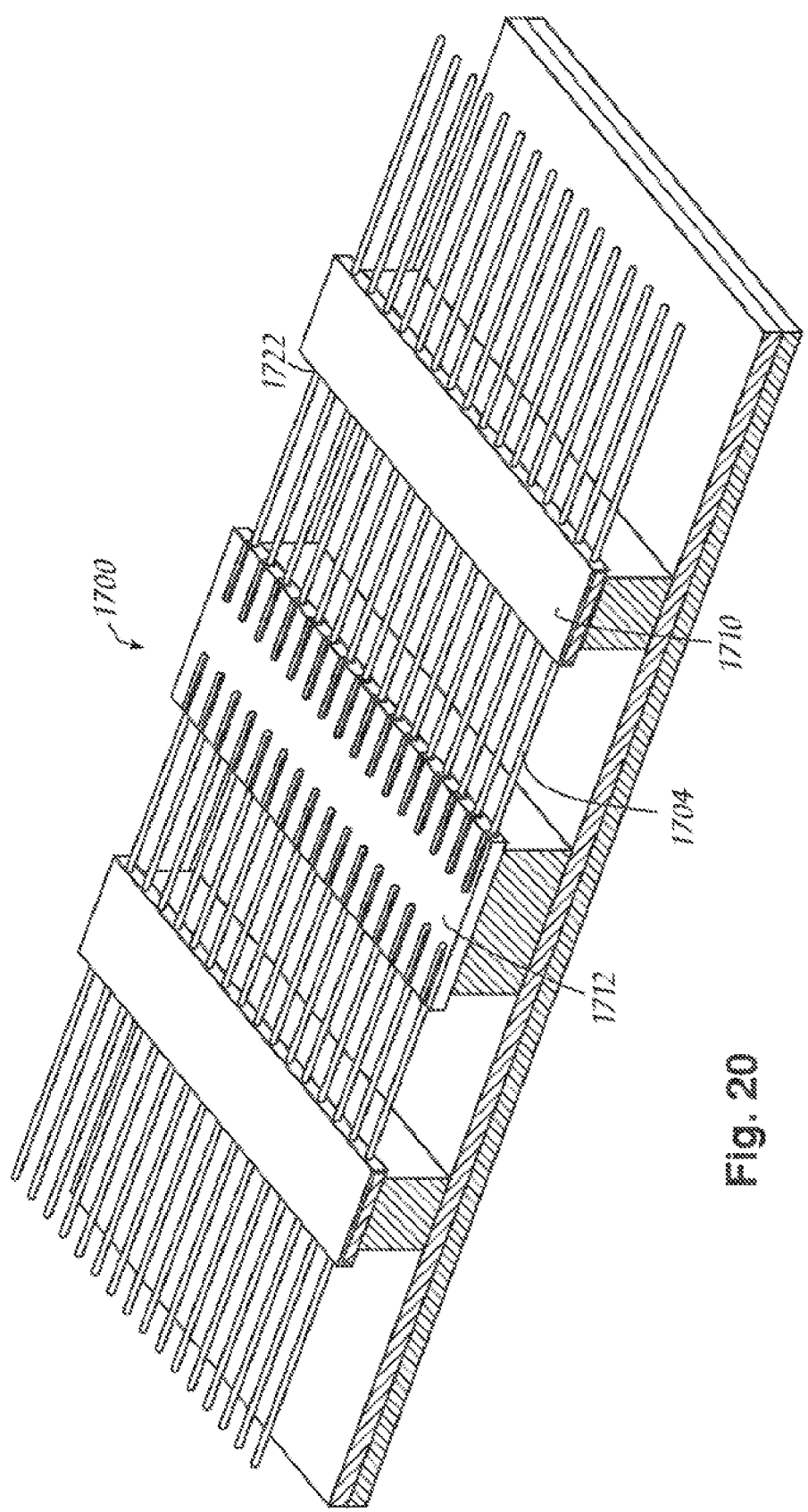

FIG. 20 shows switch assembly 1700 with carbon nanotubes 1704 secured to metallic trace 1712. Coating 1708 has been removed to form gaps 1722 between tips of carbon nanotubes 1704 and conductive traces 1710.

Figure 21:
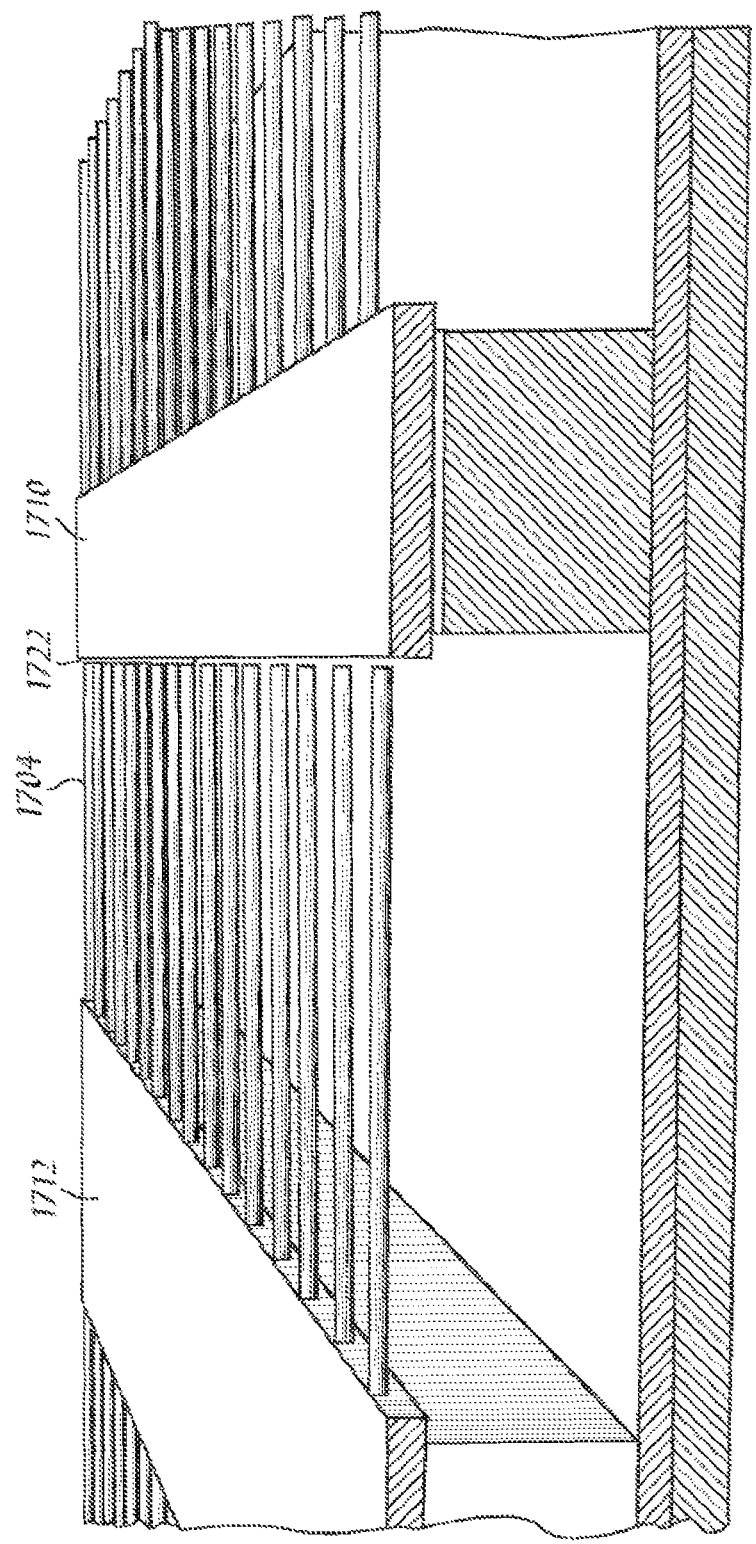

FIG. 21 shows an enlarged view of a portion of switch assembly 1700 with tunneling gaps 1722 visible between carbon nanotubes 1704 and conductive traces 1710. The width of gaps 1722 correspond substantially to the chosen thickness of coating 1708. In some embodiments, a thickness of gaps 1722 may be about 1 nm.

Figure 22:
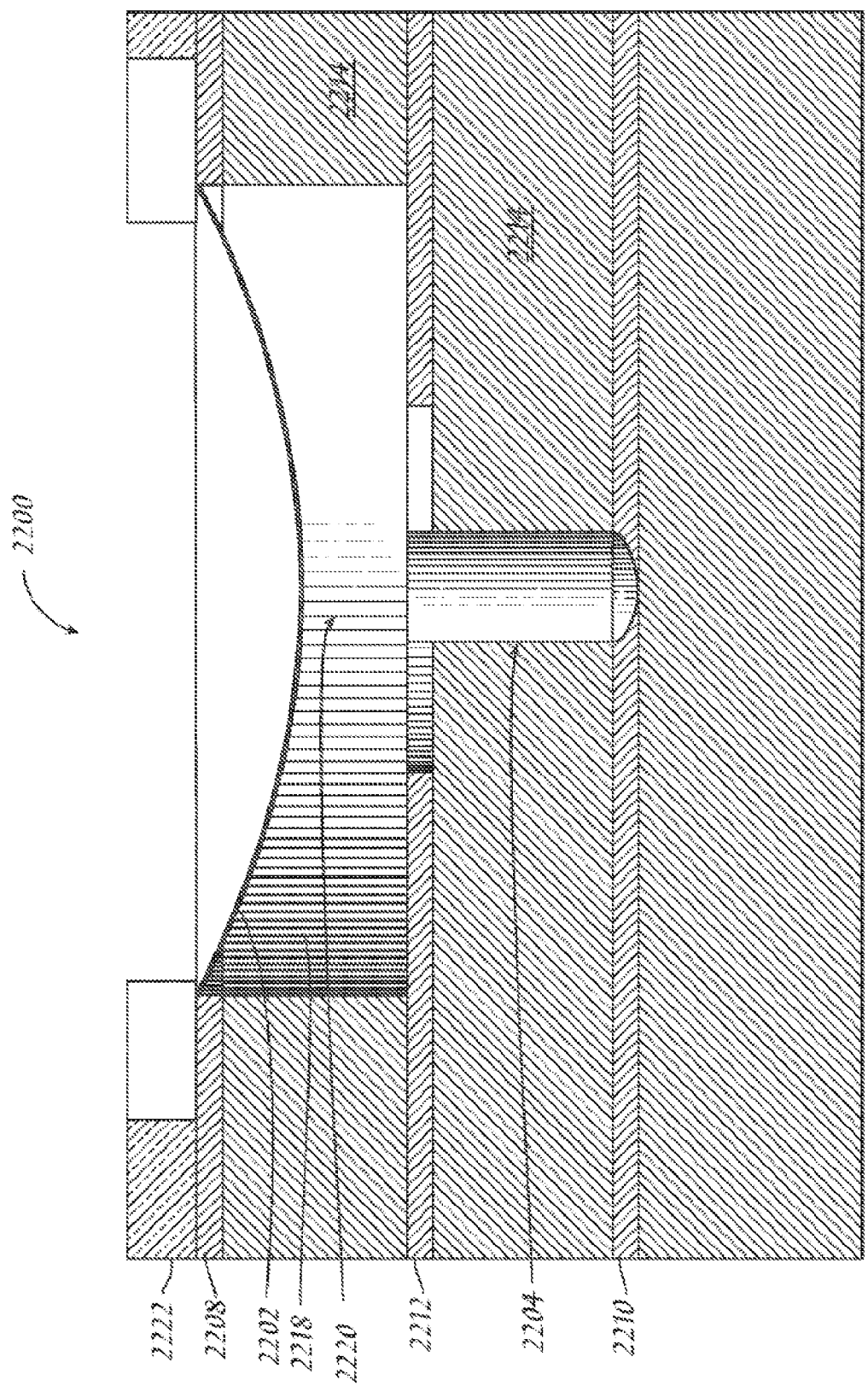
FIG. 22 is a side view of another embodiment of a tunneling current switch assembly having a graphene membrane.

FIG. 22 is a side view of a tunneling current switch assembly having a graphene membrane (otherwise referred to as a "graphene drum"). Graphene drums can be fabricated using processes such as disclosed in Lee et al. Science, 2008, 321, 385-388 ("Lee").

Figure 23:
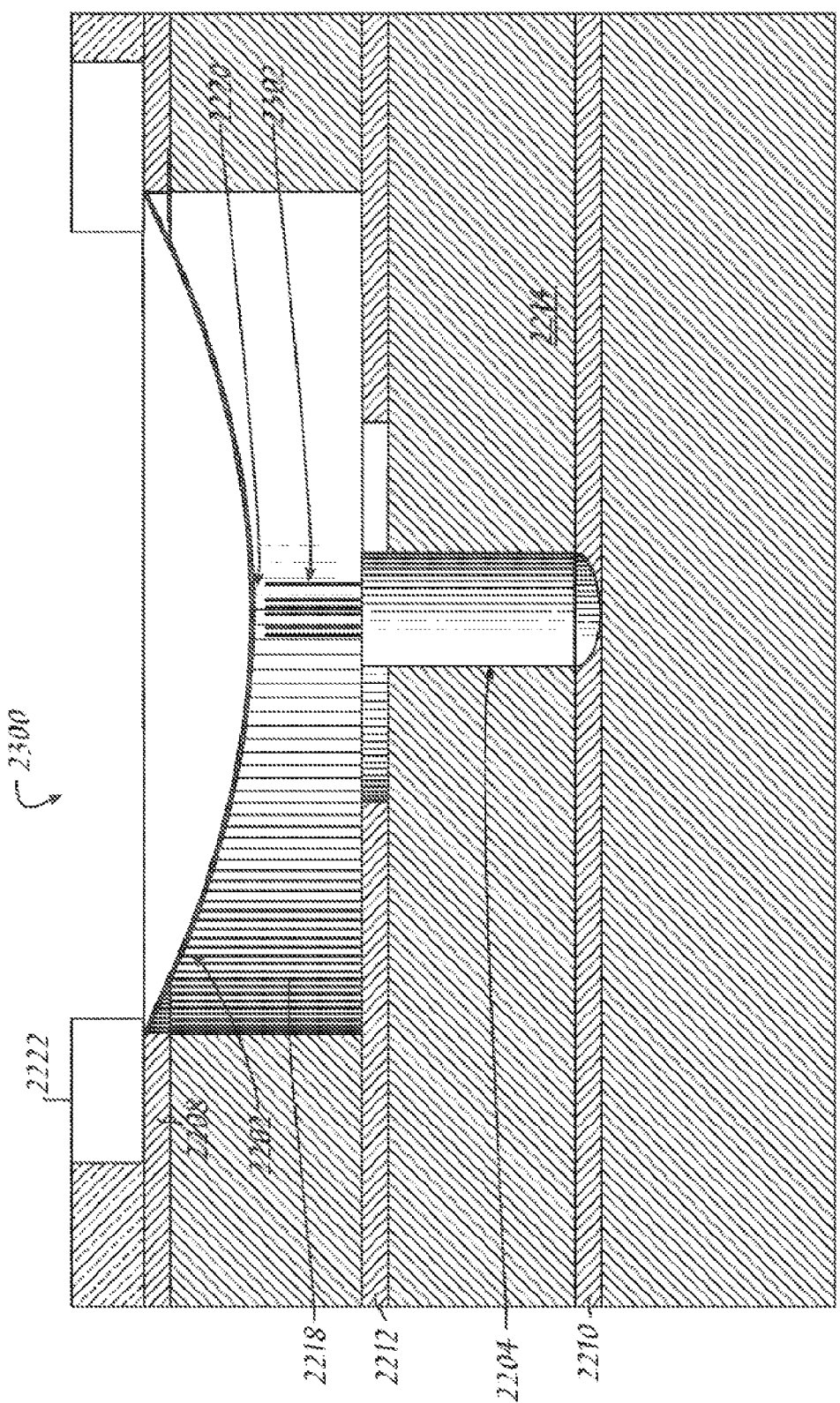
FIG. 23 is a side view of another embodiment of a tunneling current switch assembly having a graphene membrane and nanofilaments.

As shown in FIG. 22, in lieu of using one free end of a nanofilament to vary the size of the tunneling current gap, the tunnel current switch assembly 2200 uses a small (generally having a diameter between about 500 nm and about 1500 nm) graphene drum 2202 that has a middle portion that periodically flexes down toward a metallic via 2204 to vary its tunneling current gap. As opposed to the tunneling current switch assemblies having nanofilament embodiments, tunnel current switch assembly 2200 in most cases requires an active feedback loop to maintain/control the gap between its moveable drum source 2208 and via drain 2210. As shown in FIG. 23, tunnel current switch assembly 2300 can also use nanofilaments 2302 in combination of the graphene drum 2202 to vary the size of the tunneling gap 2220.

As illustrated in FIG. 22, a DC voltage is between the source 2208 and drain 2210. A gate 2212 is also positioned between the source 2208 and drain 2210, with oxide 2214 sandwiched therebetween. Optionally, a metallic trace 2222 can further be included for stacking.

To turn the switch on, a voltage can be applied to gate 2212 that is opposite polarity of the source/drum voltage. Once the graphene drum 2202 gets with a few nanometers of the metallic via/drain, attractive VDW forces will also start to pull graphene drum 2202 toward via 2204. These attractive forces must be balanced with the mechanical restoration force of the graphene drum and force from compressing a gas (if a gas is present) within the chamber 2218.

Unless the graphene drum 2202 physically comes in contact with via 2204, generally a stable equilibrium between these forces can be obtained by constantly adjusting the gate voltage to maintain a desired tunneling current gap 2220 between graphene drum 2202 and via 2204. Because tunneling current varies dramatically with gap size (e.g., a one angstrom change in gap size can cause ten-fold change in tunneling current), it can be used as feedback to accurately control gap size. A voltage proportional to the tunneling current can be fed to a processor which in turn adjusts the gate voltage.

Figure 24:
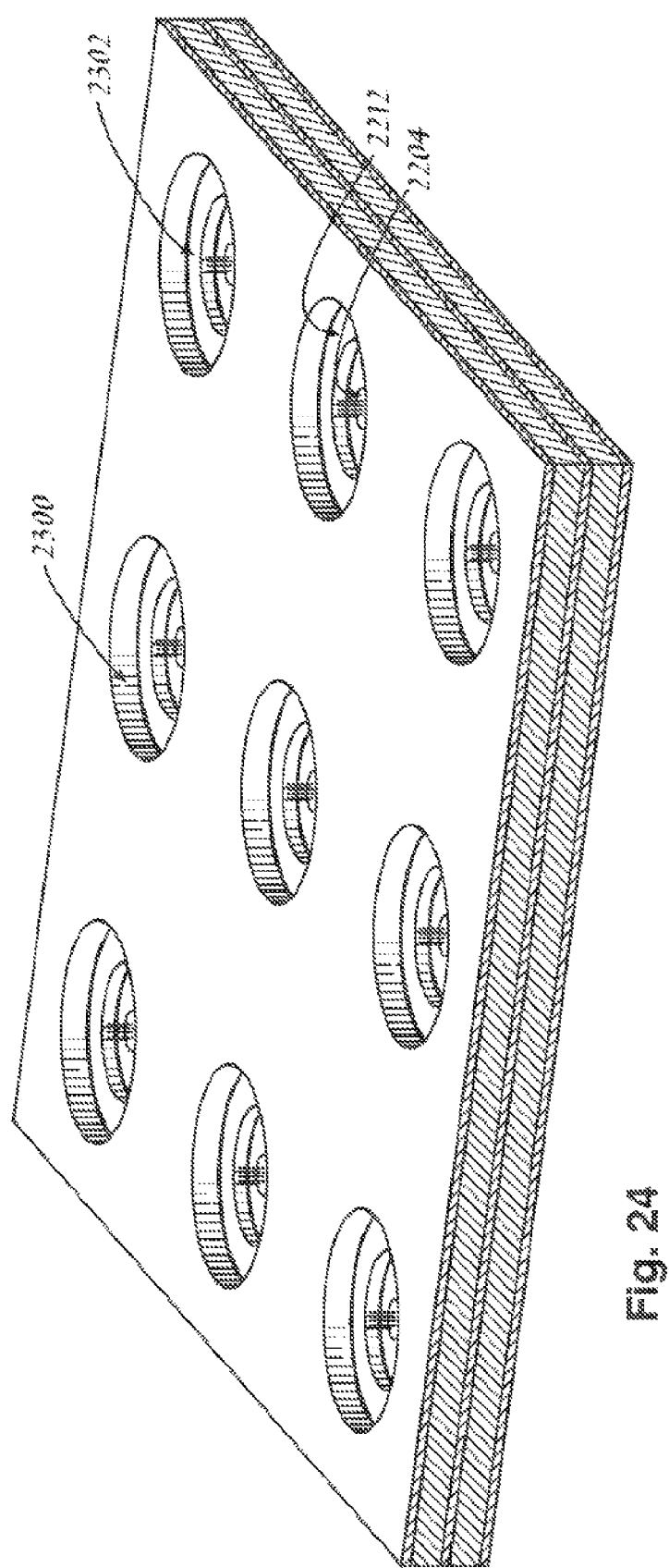
FIG. 24 illustrates a parallel array of graphene membranes tunneling current switch assemblies as shown in FIG. 23.

If a gas is present in chamber 2218, the repulsive pressure force will increase due to the heat from the tunneling current. This increase in repulsive force can help to fine tune tunneling gap if many drum switches are placed in parallel with a parallel gate, such as illustrated in FIG. 24. (While FIG. 24, illustrates a parallel array of tunnel current switch assemblies 2300 as shown in FIG. 23 (i.e., switch assemblies having nanofilaments 2302), a parallel array of tunnel current switch assemblies 2200 as shown in FIG. 22 can alternatively be used). For instance, if one graphene drum 2202 has a higher tunneling current than other graphene drums, its gas pressure will rise, thereby increasing the drum/via gap, which lowers the tunneling current to a point where it is similar to other drum switches for a given gate voltage. It is possible to adjust the relative dimensions of the drum switch so that the non-gate forces cancel when the drum is about 1 nanometer from the via 2204 so that very small changes in gate voltage result in very large changes in tunneling current.

Figure 25:
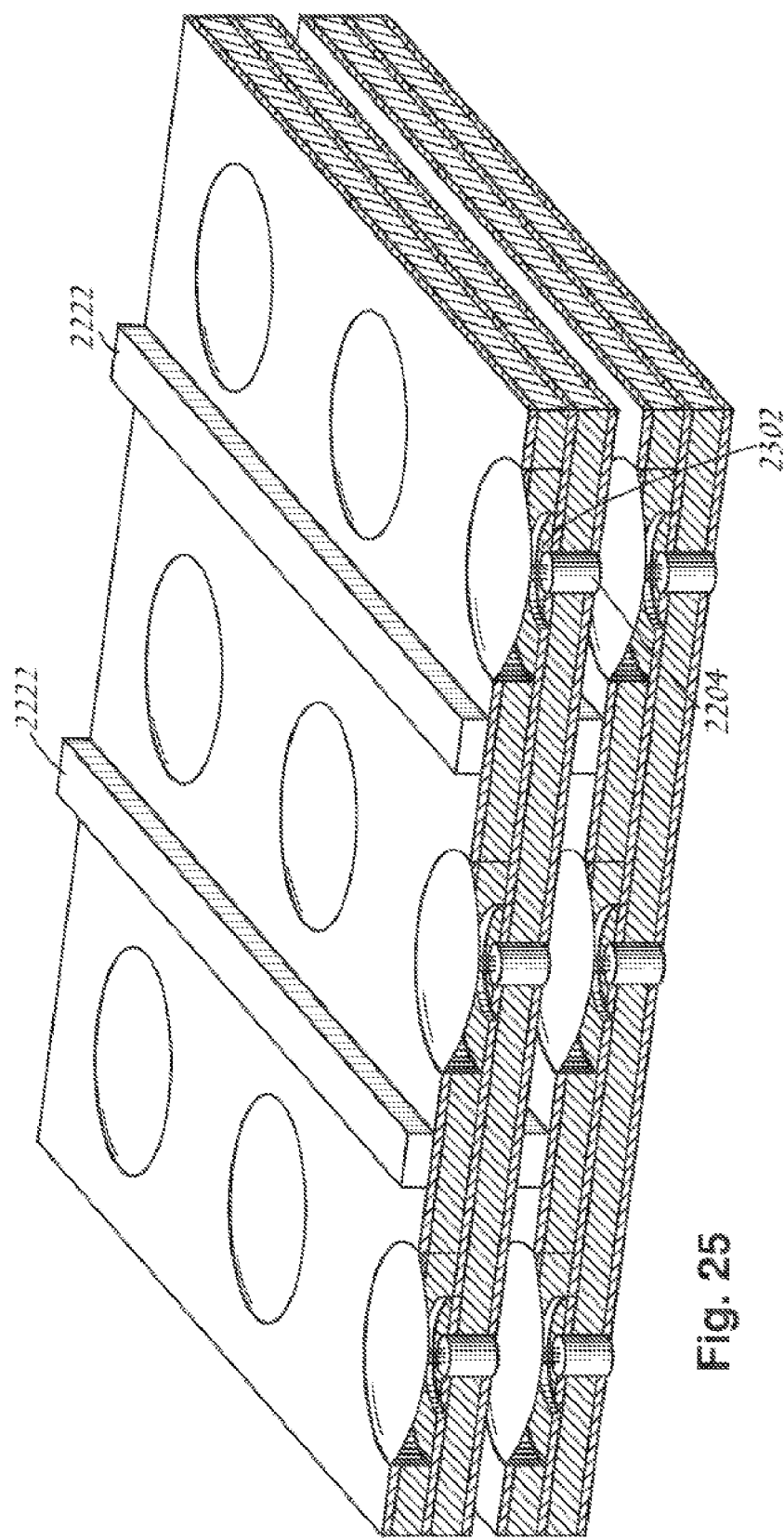
FIG. 25 is an cutout view of two parallel arrays of graphene membranes tunneling current switch assemblies in FIG. 24 that are connected in series.

FIG. 25 is a cutout view of the parallel array of graphene membrane tunneling current switch assemblies in FIG. 24.

Figure 26:
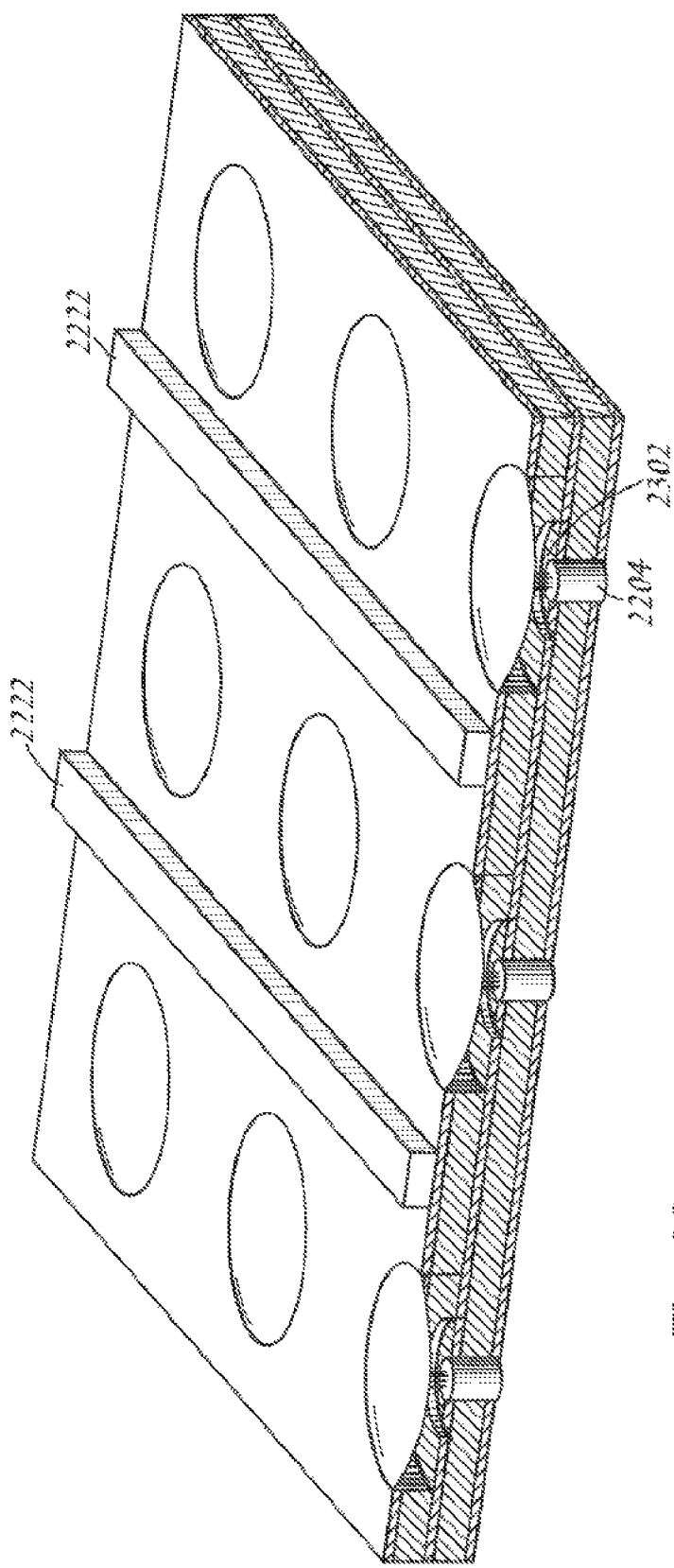
FIG. 26 is cutout view of the parallel array of graphene membranes tunneling current switch assemblies in FIG. 24.

FIG. 26 is another cutout view of the parallel array of graphene membrane tunneling current switch assemblies in FIG. 24. It illustrates that a metallic trace 2222 can be is utilized for stacking.

As illustrated in FIG. 24, the area of gate 2212 is much larger than the area of via 2204. A reason for this is so that the gate force can easily overcome the electric attraction force between drum/source and via/drain. Optionally, vertical CNTs or about 1 nanometer diameter metallic beads can be placed on top of metallic via 2204 to minimize surface area facing graphene drum 2202 and thus lower VDW forces between graphene drum 2202 and via 2204.

By these arrangements of FIGS. 22-26, there can be an ease and low cost in manufacture because, for example, a single sheet of graphene can cover a 1 cm$^2$ or larger metal-oxide chip containing millions of switch chambers. If an occasional pulse of high current (to clear electrical faults, etc.) is needed, this can performed by physically contacting graphene drum 2202 and via 2204. There would also be no need for a burning/melting operation to establish a tunneling gap. The entire graphene sheet of the graphene drum 2202 is highly electrically conductive, as compared with CNTS, which only about 30% of CNTs are as conductive. The area between graphene drum 2202 and via 2204 is larger, which possibly minimizes effective resistance and associated losses. The utilization of the gas pressure in the chamber 2218 (such as described above) can be used to keep the gap constant across millions of parallel switches (with one gate controlling millions of switches).

By these arrangements of FIGS. 22-26, the tunneling gap can be automatically sealed in a clean environment (the graphene drum 2202 will provide a complete seal to outside gases and liquids). In such instance, a metal-oxide chip and graphene sheet can be positioned within a chamber before transfer. The chamber can then be filled with any gas at any pressure or can be evacuated (i.e., a vacuum). The graphene sheet can be applied to top of the chip, and then the chip-graphene assembly can be removed from the chamber. After this operation, the switch chamber between the graphene membrane and via/drain will contain whatever gas (and associated pressure) was in the chamber. A benefit of this operation/characteristic is that the chip-graphene assembly does not need to be sealed in a vacuum or gas chamber (like a vacuum tube) to operate well over time even in harsh environments. Moreover, the gas and/or its pressure can be chosen as needed to optimize the switch performance. With the proper gas, gas pressure, and well/drum geometry, it may be possible to create a stable equilibrium (when drum and via/drain separation is within a tunneling current range) within a small range. If a vacuum is desired, a small amount of getter material can be sputtered (to maintain vacuum over time) within each well before sealing with the graphene sheet.

A number of embodiments of the invention have been described. Nevertheless, it will be understood that various modifications may be made without departing from the spirit and scope of the invention. Accordingly, other embodiments are within the scope of the following claims.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. For example, nanofilament pump assemblies can be layered or stacked (for instance, vertically) to increase output. In some embodiments, a sheet with NEM switch assemblies is rolled into a cylinder, and current is allowed to flow from a first end of the cylinder to a second end of the cylinder. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein

What is claimed is:

1. A switch comprising:
   (i) a cantilevered nanofilament comprising a secured end and an unsecured end;
   (ii) a conductor with a surface substantially perpendicular to a longitudinal axis of the nanofilament when the nanofilament is undeflected, wherein the nanofilament is positioned with respect to the conductor to define a gap between the unsecured end of the nanofilament and the surface of the conductor substantially perpendicular to the longitudinal axis of the nanofilament; and
   (iii) a circuit electrically connecting the nanofilament and the conductor, wherein
      (a) a tunneling current is configured to flow between the nanofilament and the surface of the conductor substantially perpendicular to the longitudinal axis of the nanofilament; and
      (b) the tunneling current is configured to flow from the nanofilament to the conductor in a direction substantially parallel to the longitudinal axis of the nanofilament when the nanofilament is undeflected.

2. The switch of claim 1, wherein the nanofilament is a carbon nanotube.

3. The switch of claim 1, wherein the nanofilament is a nanowire.

4. The switch of claim 1, wherein the conductor is a conductive trace.

5. The switch of claim 1, further comprising one or more additional conductors.

6. The switch of claim 1, further comprising a heating element configured to heat the nanofilament.

7. The switch of claim 1, further comprising one or more additional nanofilaments to form an array of nanofilaments.

8. The switch of claim 1, wherein the gap is in a range between about 0.3 nm and about 2 nm.

9. The switch of claim 1 further comprising a gate, wherein the gate is operable to create an electric field such that, when the nanofilament is charged, a change in gate voltage will cause a change in the tunneling current.

10. A memory element comprising the switch of claim 1, wherein the nanofilament will tend to center itself near the conductor due to van der Waals forces.

11. A memory element comprising the switch of claim 1, wherein the nanofilament will tend to adhere to a non-conductive sidewall due to van der Waals forces.

12. A piezoelectric generator array comprising the switch of claim 1 and having an array of piezoelectric filaments operable to convert heat into a current output.

13. A switch comprising:
   (i) a cantilevered nanofilament comprising a secured end and an unsecured end, wherein the nanofilament has a thermal amplitude;
   (ii) a conductor with a surface substantially perpendicular to a longitudinal axis of the nanofilament, wherein the nanofilament is positioned with respect to the conductor to define a gap between the unsecured end of the nanofilament and the surface of the conductor substantially perpendicular to the longitudinal axis of the nanofilament, wherein the length of the gap varies in time based at least in part on the thermal amplitude of the nanofilament; and
   (iii) a circuit electrically connecting the nanofilament and the conductor, the circuit arranged such that
      (a) a tunneling current is configured to flow between the nanofilament and the surface of the conductor substantially perpendicular to the longitudinal axis of the nanofilament through the gap, wherein the tunneling current varies in time based at least in part on the thermal amplitude of the nanofilament, and
      (b) the tunneling current is configured to flow from the nanofilament to the conductor in a direction substantially parallel to the longitudinal axis of the nanofilament when the nanofilament is undeflected.

14. A switch comprising:
   (i) a cantilevered nanofilament comprising a secured end and an unsecured end;
   (ii) a conductor with a surface substantially perpendicular to a longitudinal axis of the nanofilament when the nanofilament is undeflected, wherein the nanofilament is positioned with respect to the conductor to define a gap between the unsecured end of the nanofilament and the surface of the conductor substantially perpendicular to the longitudinal axis of the nanofilament;
   (iii) a circuit electrically connecting the nanofilament and the conductor, wherein
      (a) a tunneling current is configured to flow between the nanofilament and the surface of the conductor, and
      (b) the tunneling current is configured to flow from the nanofilament to the conductor in a direction substantially parallel to the longitudinal axis of the nanofilament when the nanofilament is undeflected; and
(iv) a gate operable to create an electric field such that, when the nanofilament is charged at one polarity,
  (a) a change in gate voltage will cause a change in the tunneling current, such that
  (b) there can be a non-zero tunneling current even when the gate voltage is zero, and
  (c) an increase in the gate voltage having an opposite polarity as nanofilament polarity can cause a decrease in the tunneling current.

15. The switch of claim 14, wherein, when the gate is further operable to create the electric field such, when the nanofilament is charged at one polarity, an increase in the gate charge at an opposite polarity as the nanofilament polarity will cause the tunnel current to turn off completely.

* * * * *